United States Patent
Baylog et al.

(10) Patent No.: US 7,020,046 B1
(45) Date of Patent: Mar. 28, 2006

(54) SYSTEM AND METHOD FOR TARGET MOTION ANALYSIS WITH INTELLIGENT PARAMETER EVALUATION PLOT

(75) Inventors: John G. Baylog, Tiverton, RI (US); Chidambar Ganesh, East Greenwich, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/463,906

(22) Filed: Jun. 16, 2003

(51) Int. Cl.
G01S 15/66 (2006.01)

(52) U.S. Cl. .................. 367/124; 367/118; 367/131

(58) Field of Classification Search ............ 367/118, 367/135, 124, 131, 907; 342/90

See application file for complete search history.

(56) References Cited

U.S. PATENT DOCUMENTS

| | | | | | |
|---|---|---|---|---|---|
| 5,067,096 A | * | 11/1991 | Olson et al. | ................ | 102/425 |
| 5,432,753 A | * | 7/1995 | Maranda | ..................... | 367/124 |
| 5,471,433 A | * | 11/1995 | Hammell et al. | ........... | 367/118 |
| 5,506,817 A | * | 4/1996 | O'Brien, Jr. | ................ | 367/135 |
| 5,732,043 A | * | 3/1998 | Nguyen et al. | ................ | 367/124 |
| 5,877,998 A | * | 3/1999 | Aidala et al. | ................ | 367/124 |
| 6,532,191 B1 | * | 3/2003 | LaRosa et al. | ............... | 367/124 |

* cited by examiner

Primary Examiner—Ian J. Lobo
(74) Attorney, Agent, or Firm—James M. Kasischke; Michael F. Oglo; Jean-Paul A. Nasser

(57) ABSTRACT

An underwater target tracking capability is disclosed for a grid-search technique utilizing parameter evaluation plot techniques comprising processing acoustic sonar measurements in conjunction with additional kinematics and environmental information. In the implementation described here, the measurements considered are passive broadband sphere bearings together with limiting knowledge of target speed and range at initial detection. These information sources are processed in a manner especially suited to enable rapid response to the emerging tactical situation.

19 Claims, 14 Drawing Sheets

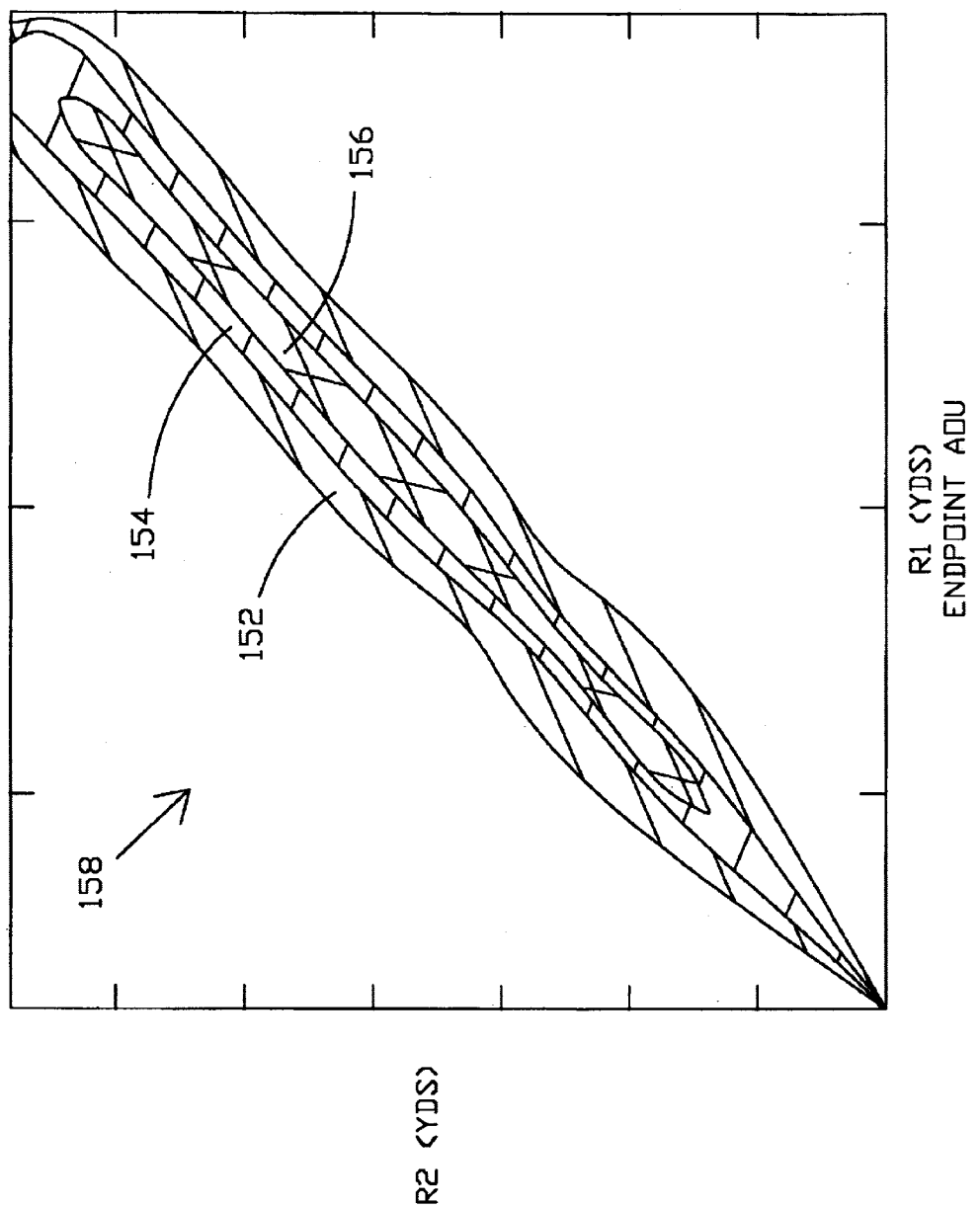

SYSTEM AND METHOD FOR TARGET MOTION ANALYSIS WITH INTELLIGENT PARAMETER EVALUATION PLOT

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to the field of estimation and tracking, and more particularly to target motion analysis (TMA) suitable for Naval applications.

(2) Description of the Prior Art

As is well known, a fundamental property of bearings-only target motion analysis (TMA) is that the contact range is not observable prior to an ownship maneuver. Hence, for a single-leg of ownship motion (a leg is defined as a time interval of constant platform velocity) only a partial solution is achievable. This introduces a time-latency in the estimation process owing to the necessity of collecting sufficient data during multiple ownship legs. This time-delay may be unacceptable under conditions when rapid estimates are desired, albeit of poorer quality, to facilitate a quick tactical response (such as in the close-aboard contact situation). As such, methods for deriving meaningful TMA solutions during single leg tactical encounters are of primary interest.

One presently utilized method for bearings-only target motion analysis for underwater target tracking is known as the parameter evaluation plot (PEP), which is a grid-search technique that is discussed in more detail hereinafter. In recent years, the PEP has been integrated into the TMA functionality of the U.S. Navy's newer Combat Systems. The accuracy of the PEP solution is a function of a range-grid resolution. With finer samples, search space resolution is improved; and the closer the estimated minimum-cost track will be to the desired true solution. However, the cost function evaluation used in the PEP becomes computationally demanding if the number of search-space samples becomes too large, impacting real-time system performance. Thus, there is an inherent tradeoff between solution accuracy and computational complexity when employing the uniform grid technique used in the PEP.

Previous efforts to related problems are described by the following patents:

U.S. Pat. No. 5,067,096, issued Nov. 19, 1991, to Olson et al., discloses a target engagement system that uses target motion analysis to determine a target engagement decision for ground targets, such as vehicles. The input to the engagement system is the target azimuth as a function of time. A detect algorithm issues and records a detect azimuth when confirmation is made that a valid target is being tracked and legitimate azimuth information is being provided. The engagement algorithm then begins and records the time intervals it takes for the target to cross two sectors, each covering 20 degrees and separate by 10 degrees. Thus, first time interval is measured from detect azimuth to 20 degrees after detect azimuth, and the second time interval is measured from 30 degrees after detect azimuth to 50 degrees after detect azimuth. When the first and second time intervals have been recorded, the ratio of the first time interval to the second time interval is calculated. If this ratio is greater than 2.0, then the target is estimated to be within range and is subsequently attacked. Otherwise, the target is greater than the range and no action is taken.

U.S. Pat. No. 5,432,753, issued Jul. 11, 1995, to Brian H. Maranda, discloses a system for target detection and localization with an algorithm for performing target motion analysis (TMA) using data from a passive sonar array and which works directly with beam spectra to estimate the target track. The system determines when the coordinate trajectory of a hypothesized target aligns with the coordinate trajectory of an actual target and operates by forming long-term integrated spectral values from short-term values of frequency and angle coordinate values. The hypothesized target track that yields the maximum long-term integrated spectral value is used as the estimate of the true target track. A track generator is used to generate hypothesized target tracks for a search grid in the form of vectors that are clocked downward in a chain of latches. The latches are connected through computational elements, which are supplied with non-acoustic data, and RAMs to a summation pipeline, the RAMs being supplied with data from an array's sonar processor. The computational elements compute and provide angle and frequency addresses to the RAMs whose outputs are applied to adders in the summation pipeline. Each RAM holds data for a single two-dimensional FRAZ spectrum. The summation pipeline supplies a completed sum of short-term spectral values at its output to provide the required long-term integrated spectral values.

U.S. Pat. No. 5,471,433, issued Nov. 28, 1995, to Hammell et al., discloses a trajectory estimation system for estimating a trajectory of a target in response to a series of data items which are generated in response to motion of the target. The trajectory estimation system includes a data segmentation means and a trajectory selection means. The data segmentation means processes the series of data items in accordance with a regression/multiple-hypothesis methodology to generate a plurality of segments, each having associated data items, which have similar features. The trajectory selection means for processing said segments in accordance with a multiple-model hypothesis methodology to generate a corresponding statistically-supportable candidate trajectory motion estimate of target motion thereby to provide indicia of an overall trajectory of the target.

U.S. Pat. No. 5,506,817, issued Apr. 9, 1996, to Francis J. O'Brien, Jr., discloses an adaptive statistical filter system for receiving a data stream, which comprises a series of data values from a sensor associated with successive points in time. Each data value includes a data component representative of the motion of a target and a noise component, with the noise components of data values associated with proximate points in time being correlated. The adaptive statistical filter system includes a prewhitener, a plurality of statistical filters of different orders, stochastic decorrelator and a selector. The prewhitener generates a corrected data stream comprising corrected data values, each including a data component and a time-correlated noise component. The plural statistical filters receive the corrected data stream and generate coefficient values to fit the corrected data stream to a polynomial of corresponding order and fit values representative of the degree of fit of corrected data stream to the polynomial. The stochastic decorrelator uses a spatial Poisson process statistical significance test to determine whether the fit values are correlated. If the test indicates the fit values are not randomly distributed, it generates decorrelated fit values using an autoregressive moving average methodology, which assesses the noise components of the statistical filter. The selector receives the decorrelated fit values and coefficient values from the plural statistical filters and selects coefficient values from one of the filters in response to the decorrelated fit values. The coefficient values are coupled to a target motion analysis module, which determines position and velocity of a target.

U.S. Pat. No. 5,732,043, issued Mar. 24, 1998, to Nguyen et al., discloses a method for selecting a set of four target bearings from a plurality of bearing measurements to optimize rapidity, accuracy and stability of a target track solution in a bearings-only target motion algorithm. Four bearings are selected to generate the deterministic solution by first selecting a candidate bearing set, then computing a set of "n" solutions from the candidate set and others adjacent thereto. Motion parameters are then computed, and any solution exhibiting parameters outside a user-defined deviation from the mean is discarded. The mean target parameters of the remaining solutions may again be computed, and further culling out performed, until the desired distribution is achieved. An optimal solution is chosen as the solution from the remaining sample space that is closest to the mean in target range, course and speed. The other solutions in the remaining solution sample space may be displayed to an operator in the form of a scatter plot of all solutions, or by a range envelope encompassing the extent of solution ranges.

U.S. Pat. No. 5,877,998, issued Mar. 2, 1999, to Aidala et al., discloses a method for estimating the motion of a target relative to an observer station and a system for performing the method. The method includes the steps of: generating data representative of the motion of the target relative to the observer station during first, second, and subsequent measurement legs; processing the data to yield smoothed estimate of the bearing, bearing rate, and bearing acceleration of the target during each measurement leg; and processing the smoothed estimates of the bearing, bearing rate, and bearing acceleration of the target to provide an estimate of the position of the target relative to the observer station and the velocity of the target. The system for performing the method includes a data preprocessing subsystem for generating the smoothed estimate of the bearing rate, bearing and bearing acceleration, a passive localization and target motion analysis subsystem, and a trajectory modeling subsystem having a first module for creating a model of the observer station motion and a second module for creating a model of the motion of the target.

The above patents do not utilize the PEP techniques and do not show how it would be possible to obtain the accuracy of a PEP fine resolution grid without the computational complexity/time required by prior art PEP techniques to produce a fine resolution grid. Consequently, those skilled in the art will appreciate the present invention that addresses the above and other problems.

SUMMARY OF THE INVENTION

An object of the present invention is to provide an improved grid-search technique.

Another object of the present invention is to provide a processor for processing acoustic sonar measurements in conjunction with additional kinematic and environmental information.

Yet another object of the present invention is to provide an intelligent system which uses passive broadband sphere bearing. measurements along with limiting knowledge of target speed and/or range at initial detection to thereby significantly reduce computations for a grid-search technique.

These and other objects, features, and advantages of the present invention will become apparent from the drawings, the descriptions given herein, and the appended claims. However, it will be understood that above listed objects and advantages of the invention are intended only as an aid in understanding aspects of the invention, are not intended to limit the invention in any way, and do not form a comprehensive list of objects, features, and advantages.

Accordingly, a method is provided for generating a course and speed of contact target motion analysis (TMA) solution based upon a bearing $\beta_1$ measured at an initial-time $T_1$ and a bearing $\beta_2$ measured at an end-time $T_2$ from an observation platform traveling along a single-leg trajectory first reference line of constant course and speed, a range of the contact being unobservable from the observation platform during the single-leg trajectory except for a best estimation of an initial range $R_1$ at the initial-time $T_1$.

A method in accord with the present invention may comprise one or more steps such as, for example, defining a two dimensional grid plot whose orthogonal dimensional axes comprise potential maximums and minimums of the initial range $R_1$ from the observation platform at the initial-time $T_1$ and the same for the end-time range $R_2$ from the observation platform at the end-time $T_2$, and further define within the grid plot a trial-track sampling space based upon at least one kinematics restraint upon the motion of the contact.

The method may further comprise defining a pattern of location within the trial-track sampling space of a first plurality of R1–R2 coordinates to sample trial-tracks which at least to a significant degree, distribute the coordinates throughout the trial-track sampling space.

Additional steps may further comprise defining a geographic plot which includes the single-leg trajectory of the observation platform and second and third reference lines along bearings $\beta_1$ and $\beta_2$, respectively, and mapping the first plurality of R1–R2 coordinates onto the geographic plot as a corresponding first plurality of trial-tracks of the contact. Moreover, the method may comprise compiling a sequence of bearing measurements $Z_n$ over a time sequence at least inclusive of times $T_1$, and $T_2$, and for each corresponding trial-track of the first plurality of trial-tracks calculating a goodness-of-fit cost function at least based upon the goodness-of-fit of the trial-tracks to the sequence of measurements $Z_m$.

In one embodiment, the kinematics constraint includes constraining the first trial-track sampling space to include only possible loci for a contact having no more than a predetermined estimated maximum speed of the contact. The trial-track sampling space may be further defined by further method elements comprising calculating an ellipse in the R1–R2 space encompassing possible loci for the contact if it were to have the predetermined estimated maximum speed and if it were to follow a constraint course and speed trajectory between the second and third reference lines along bearings $\beta_1$ and $\beta_2$ and/or defining the trial-track sampling space as an ellipsoidally shaped sampling space.

The pattern of locations of the first plurality of R1–R2 coordinate to sample trial tracks may be further defined by method elements comprising defining a hypothetical range-ratio (RR) fourth reference line within the R1–R2 grid plot and/or defining a plurality of spaced tie-down points along the fourth reference line and/or defining a corresponding plurality of fifth reference lines passing through respective so the plurality of spaced tie-down points and orthogonal to the fourth reference line. Other steps may comprise distributing a part of the first plurality of R1–R2 coordinates to sample trial-tracks along each respective fifth reference line in a spaced relationship to one another and between the bounds of the two sides of the ellipsoidally shaped sampling space.

Where an estimate of range-ratio, $R_2/R_1$ at time $T_1$ is available, and the kinematics constraint may further comprise constraining the sampling space to include only possible loci for the contact to have a course within a range of courses based upon an estimated direction of relative motion (DRM) which in turn is based upon the estimated range ratio $R_2/R_1$ and upon estimated measurement deviations therefrom.

In one preferred embodiment, the sampling space may be further refined as a multiple kinematics constraints formed sampling space by further methods elements comprising calculating an ellipsoidally shaped first subspace of the R1–R2 grid plot encompassing possible loci for the contact if it were to have a predetermined estimated maximum speed and followed a constraint course and speed trajectory between the bearing $\beta_1$ and $\beta_2$ second and third reference lines. Additional steps may comprise defining a sixth referenced line in the R1–R2 grid plot having a slope equal to range-ratio $R_{2/R1}$ and/or defining a range-ratio wedge shaped second subspace of the R1–R2 grid plot encompassing loci between a pair of seventh and eighth reference lines representing the bounds of spread of estimated measurement deviations from the estimated range ratio $R_2/R_1$ and/or defining the multiple kinematics constraints formed sampling space as the loci within the intersection of the first and second subspaces.

The pattern of locations of the first plurality of R1–R2 coordinates to sample trial tracks may be further defined by method elements comprising defining a plurality of spaced tie-down points along the sixth reference line and/or defining a corresponding plurality of ninth reference lines passing through respective of the plurality of spaced tie-down points and orthogonal to the sixth reference line, and/or distributing a part of the first plurality of R1–R2 coordinates to sample trial-tracks at respective ones of each of the corresponding plurality of ninth reference lines in spaced relationship to one another and between the bound of the multiple kinematics constraints formed sampling space.

The cost function may be further based upon a prior estimate of the likelihood distribution of a tactical parameter which is used as a variable in the TMA solution such as, for example, wherein the tactical parameter is speed of the contact.

The sequence of bearing measurement, $Z_n$, may be obtained employing sonar, and/or the cost function may be further based upon an a priori estimate of a likelihood of distribution of an environmental parameter which influences sonar reception and which is used as a variable in the TMA solution. In one embodiment, the environmental parameter may be the maximum range of initial sonar detection of the contact along the bearing $\beta_1$ second reference line. The sequence of bearing measurement, $Z_m$, may be obtained employing sonar and/or the cost function may be further based upon an a priori estimate of a likelihood of distribution of a tactical parameter used in as a variable in the TMA solution and/or the cost function may yet be further based upon an a priori estimate of an environmental parameter which influences sonar reception and which is used as a variable in the TMA solution.

In another embodiment, the method may comprise selecting the minimum cost trial-track as the TMA solution and/or on the basis of the cost function of the second plurality of trial tracks in geographic plot space, calculating an area-of-uncertainty (AOU) of a type of the group of types of AOU's consisting of an AOU cost surface in geographic plot space, an AOU cost surface in R1–R2 space, and an AOU cost surface in course-speed space.

Accordingly, the present invention also provides a system for bearings only target motion analysis to determine a target position comprising a target range and a target bearing, and to determine a target velocity comprising a target course and a target speed based on a plurality of passive sonar contacts with a target of interest from an observation platform traveling along a single-leg trajectory such that the target range is not observable except for a best estimation of an initial target range. The system may comprise one or more elements such as, for example, a search space module for determining a limited search space defined within in a coordinate system comprised of the initial target range potential maximum and minimum for a first coordinate system axis and the end-time target range potential maximum and minimum for a second coordinate system axis. The limited search space may be limited at least partially by a likelihood of maximum target speed such that all feasible tracks for the target with the likelihood of maximum target speed are contained within the limited search space. A grid sampling module may be provided for making substantially uniform data samples within the limited search space. A cost function module may be provided for determining at least a triple error cost function for the substantially uniform data samples based on at least three error components such as bearing data, initial target range data, and expected maximum target speed data.

In one preferred embodiment, the system may limit the search space by an intersection formed utilizing a speed ellipse and a range-ratio wedge, wherein all feasible tracks for the target with the likelihood of maximum target speed are contained within speed ellipse, and wherein the range-ratio wedge is based on estimated range-ratio line of the final target range with respect to the initial target and estimated deviations from the range-ratio line. The search space module may be operable for determining a range-ratio line based on an estimated ratio of the final target range with respect to the initial target range, and wherein the grid sampling module is operable to utilize points along the range ratio line to establish the grid of the substantially uniform data samples. A display module may be provided that is operable for producing a course speed display of the target in target velocity orthogonal coordinates and/or for producing a display in geographic orthogonal coordinates.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing, wherein like reference numerals refer to like parts and wherein:

FIG. 10A is a graph showing an end point area of uncertainty (AOU) plot within an $R_1$–$R_2$ coordinate system in accord with the present invention;

DESCRIPTION OF THE PREFERRED EMBODIMENT

Figure 1:
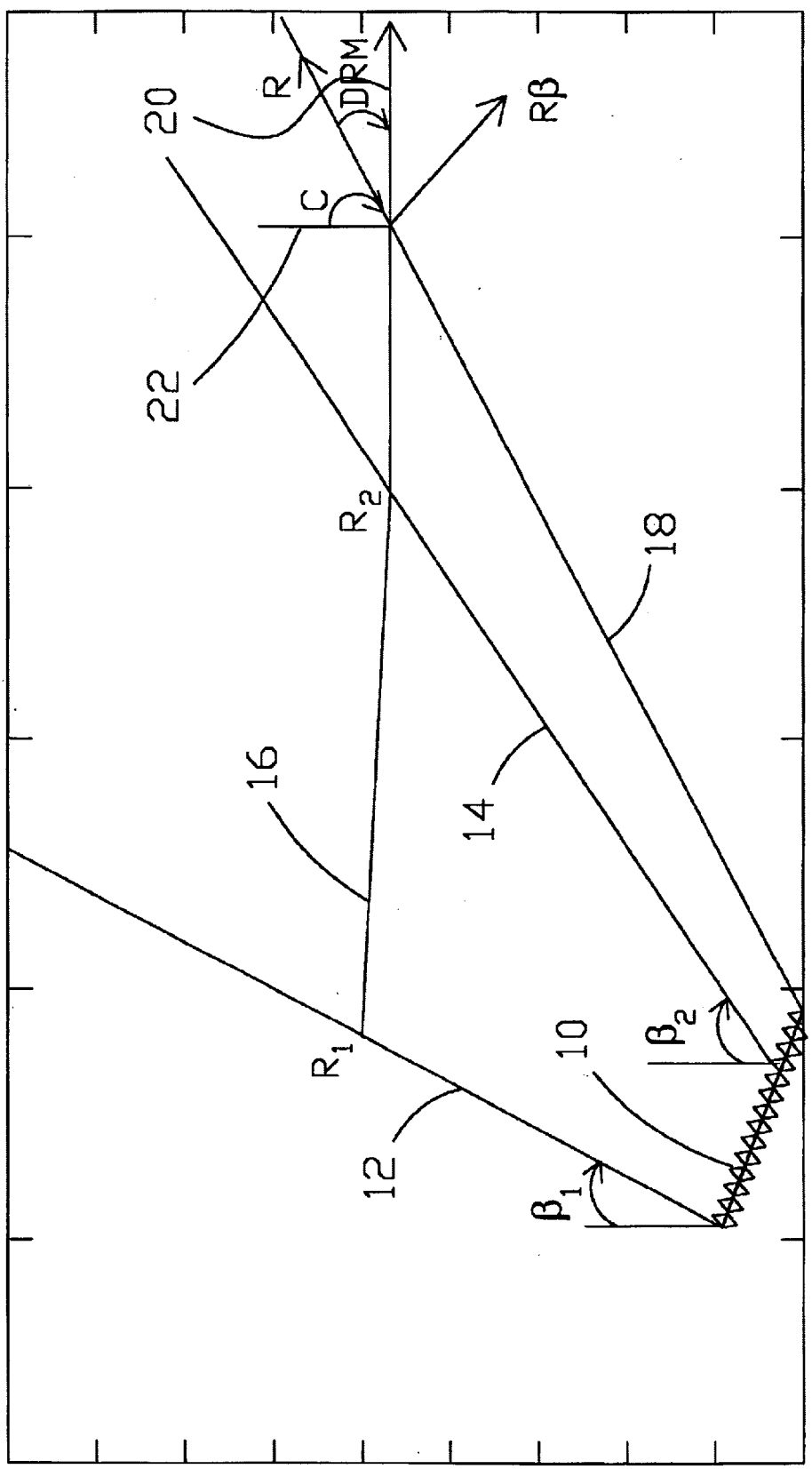
FIG. 1 is an example of a geographic display showing single-leg target motion analysis (TMA) in a modified polar and endpoint coordinate system.

In this application, methods are provided related to the bearings-only TMA problem of estimating contact location (i.e., range and bearing) and motion (i.e., course and speed) parameters using a time-series of passive broadband bearing measurements from a spherical array. The present invention provides methods for generating a course and speed of contact target motion analysis (TMA) solution based upon a bearing $\beta_1$ measured at an initial-time $T_1$ and a bearing $\beta_2$ measured at an end-time $T_2$ from an observation platform traveling along a single-leg trajectory first reference line of constant course and speed.

The words "Intelligent" and "Smart" as used above are from the vernacular of developers and users of data processing and decision systems. They allude to a feature of a data processing and decision system, or a component thereof, which perform like exercise of human intelligence or smart human intellect.

The convention used in this description in handling terms representing vector quantities is as follows. The types of mathematical manipulations, represented by equations, set forth in the description are of families of mathematical manipulation which readers having skill in the art are familiar with. These readers will readily recognize which terms represent vector quantities from the equation's content. Therefore no special form of notation (e.g., a bar over the term, or bold font) is used to indicate which terms are vector quantities.

A standard mathematical approach is utilized to decouple the observable and unobservable components of the state estimate. This can be done for bearing-only TMA through the use of range-normalized coordinates defined by the Modified Polar (MP) coordinate system. The MP state vector is defined as $$x_{MP}(t) = \begin{bmatrix} \beta \\ \dot{\beta} \\ \dfrac{\dot{R}}{R} \\ \dfrac{1}{R} \end{bmatrix},$$

with $\beta$ = bearing, (1)

$\dot{\beta}$ = bearing rate, $\dfrac{\dot{R}}{R}$ = range normalized range rate, $\dfrac{1}{R}$ = inverse range, The Modified Polar coordinate system has the desirable property of decoupling relative motion estimation from range estimation when bearings-only data is processed prior to an ownship maneuver. While ownship motion is generally unrestricted, a constant velocity target kinematics assumption is employed to propagate contact state over time. Detail into the modeling specifics is provided below.

The equations-of-state provided below are nonlinear and provide the mapping necessary to propagate a Modified Polar state vector defined at time $t_0$ to time $t_1$ and, following a derivation beyond the scope of a description of the present invention, are expressed as a function of the initial state and intermediate variable $\alpha_i$; that is $x(t_i) = f(x(t_0), \alpha(x(t_0)))$.

$$\beta(t_i) = \beta(t_0) + \tan^{-1}\left(\frac{\alpha_1}{\alpha_2}\right) \tag{2}$$

$$\dot{\beta}(t_i) = (\alpha_2\alpha_3 - \alpha_1\alpha_4)/(\alpha_1^2 + \alpha_2^2) \tag{3}$$

$$\frac{\dot{r}}{r}(t_i) = (\alpha_1\alpha_3 + \alpha_2\alpha_4)/(\alpha_1^2 + \alpha_2^2) \tag{4}$$

$$\frac{1}{r}(t_i) = \frac{1}{r}(t_0) \bigg/ \sqrt{\alpha_1^2 + \alpha_2^2} \tag{5}$$

where the $\alpha_i$ are given by $$\alpha_1 = \Delta T \cdot \dot{\beta}(t_0) - \frac{1}{r}(t_0) \cdot u_{p\perp} \tag{6}$$

$$\alpha_2 = 1 + \Delta T \frac{\dot{r}}{r}(t_0) - \frac{1}{r}(t_0) \cdot u_{p\|} \tag{7}$$

$$\alpha_3 = \dot{\beta}(t_0) - \frac{1}{r}(t_0) \cdot u_{p\perp} \tag{8}$$

$$\alpha_4 = \frac{\dot{r}}{r}(t_0) - \frac{1}{r}(t_0) \cdot u_{p\|} \tag{9}$$

and where $\Delta T = t_i - t_0$. The $u(t_0,t_i) = [u_{p\perp}, u_{p\|}, u_{v\perp}, u_{v\|}]^T$ quantities represent perturbations from constant ownship velocity in Cartesian position and velocity coordinates across and along the line-of-bearing due to ownship acceleration; specifically, $$\begin{bmatrix} u_{p\perp} \\ u_{p\|} \end{bmatrix} = M_0 \cdot \begin{bmatrix} Rxo(t_i) - Rxo(t_0) - Vxo(t_0)\Delta T \\ Ryo(t_i) - Ryo(t_0) - Vyo(t_0)\Delta T \end{bmatrix}, \begin{bmatrix} u_{v\perp} \\ u_{v\|} \end{bmatrix} = \qquad (10)$$

$$M_0 \cdot \begin{bmatrix} Vxo(t_i) - Vxo(t_0) \\ Vyo(t_i) - Vyo(t_0) \end{bmatrix}$$

where $[Rxo, Ryo, Vxo, Vyo]^T$ represents the ownship state in an absolute Cartesian coordinate system and M is the two-dimensional coordinate rotation matrix $$M_0 = \begin{bmatrix} \cos\beta(t_0) & -\sin\beta(t_0) \\ \sin\beta(t_0) & \cos\beta(t_0) \end{bmatrix}. \qquad (11)$$

The observation model often used, $z_i = \beta_i + v_i$, where $v_i$ is a random noise component, results in an estimation paradigm that is linear in the measurement model and non-linear in the plant (or kinematics) model. In gradient-based estimation methods, a linearization of the process model is often required in forming gradients. Doing so for the equations above yields $$\Phi(t_0, t_i) = \frac{\partial f}{\partial x(t_0)} + \frac{\partial f}{\partial \alpha} \frac{\partial \alpha}{\partial x(t_0)} \qquad (12)$$

where $\Phi(t_0,t_i)$ approximates the state transition matrix from time $t_0$ to $t_i$ and $$\frac{\partial f}{\partial x(t_0)} = \begin{bmatrix} 1 & 0 & 0 & 0 \\ 0 & 0 & 0 & 0 \\ 0 & 0 & 0 & 0 \\ 0 & 0 & 0 & 1/\sqrt{\alpha_1^2 + \alpha_2^2} \end{bmatrix}, \qquad (13)$$

$$\frac{\partial \alpha}{\partial x(t_0)} = \begin{bmatrix} \frac{1}{r}u_{p\|} & \Delta T & 0 & -u_{p\perp} \\ -\frac{1}{r}u_{p\perp} & 0 & \Delta T & -u_{p\|} \\ \frac{1}{r}u_{v\|} & 1 & 0 & -u_{v\perp} \\ -\frac{1}{r}u_{v\perp} & 0 & 1 & -u_{v\|} \end{bmatrix}, \text{ and} \qquad (14)$$

$$\frac{\partial f}{\partial \alpha} = \begin{bmatrix} \alpha_2 & -\alpha_1 & 0 & 0 \\ -\alpha_1\dot\beta(t_0) - \alpha_2\frac{\dot r}{r}(t_0) & \alpha_1\frac{\dot r}{r}(t_0) - \alpha_2\dot\beta(t_0) & \alpha_2 & -\alpha_1 \\ -\alpha_1\frac{\dot r}{r}(t_0) + \alpha_2\dot\beta(t_0) & -\alpha_1\dot\beta(t_0) - \alpha_2\frac{\dot r}{r}(t_0) & \alpha_1 & \alpha_2 \\ -\frac{\alpha_1}{\sqrt{\alpha_1^2+\alpha_2^2}}\frac{1}{r}(t_0) & -\frac{\alpha_1}{\sqrt{\alpha_1^2+\alpha_2^2}}\frac{1}{r}(t_0) & 0 & 0 \end{bmatrix} \qquad (15)$$

$$\frac{1}{\alpha_1^2 + \alpha_2^2}$$

For single-leg geometries, the first three state components decouple from the inverse range estimate, the former of which constitutes a relative motion solution. That is, given a time-series of noise-corrupted bearing measurements, a complete description of single-leg target relative motion at current time t is provided by the Modified Polar (MP) state $$x_{MP}(t) = [\beta \dot\beta \dot R/R]^T \qquad (16)$$

Convergence of the final inverse range parameter occurs subsequent to an ownship maneuver. The present state of engineering practice is to employ a Modified Polar filter to estimate the state XMP (there are several different types of MP estimators, the approach adopted in this application is a sequential iterated batch).

An equivalent description is given by the Endpoint (EP) or Modified Endpoint (MEP) coordinate systems, which are often used to process bearings-only data. These are defined as $$x_{EP}(t) = \begin{bmatrix} \beta_1 \\ \beta_2 \\ R_2 \\ R_1 \\ R_2 \end{bmatrix}, \text{ or } x_{MEP}(t) = \begin{bmatrix} \beta_1 \\ \beta_2 \\ \frac{R_2}{R_1} \\ R_2 \end{bmatrix} \qquad (17)$$

Here, $R_1$ and $\beta_1$ are defined as the range and bearing at an initial-time $T_1$, while $R_2$ and $\beta_2$ are the range and bearing at an end-time $T_2$. These times are denoted as timelines 1 and 2 respectively, and the timeline bearing are shown graphically in FIG. 1. In FIG. 1, referring to ownship path 10, timeline 1 bearing 12 and timeline 2 bearing 14. The target moves along path 16. The current bearing is 18. The direction of relative motion (DRM) is indicated as 20. The relative course with respect to due North is indicated at 22.

It is to be noted that the parameter $R_2/R_1$ constitutes a range-ratio. It is estimated independent of knowledge of individual ranges $R_1$ or $R_2$. A preferred source of this estimate is mathematical manipulations that map Modified Polar estimates to range-ratio estimates, and are obtainable independent of knowledge of R1 and R2. These are stated hereinbelow in a discussion of the "range-ratio limits in R1–R2 space" aspects of the Smart Grid of the present invention (i.e., discussed in conjunction with FIG. 5). The derivation of these manipulations is beyond the scope of a description of the present invention. However, it is to be understood that the present invention is not limited to employing these mathematical manipulations independent of R1 and R2. The source or sources of $R_2/R_1$ could be one or more sonars which provide range-of-contact data.

Using the above described mappings, the relationship between the MP and the MEP state descriptions can be examined as follows. From the appendix, propagation in time of bearing and inverse range is given by $$\beta_i = \beta_0 + \tan^{-1}\left(\frac{\dot\beta \cdot (T_i - t_0) - \frac{1}{R} \cdot u_{p\perp}}{1 + \frac{\dot R}{R} \cdot (T_i - t_0) - \frac{1}{R} \cdot u_{p\|}}\right) \qquad (18)$$

$$\frac{1}{R_i} = \frac{1}{R_0} \frac{1}{\sqrt{\left(1 + \frac{\dot R}{R} \cdot (T_i - t_0) - \frac{1}{R} \cdot u_{p\|}\right)^2 + \left(\dot\beta \cdot (T_1 - t_0) - \frac{1}{R} \cdot u_{p\perp}\right)^2}} \qquad (19)$$

Using this MP state estimate at reference time $t_0$ and subscripting the acceleration terms u to indicate the time interval over which state perturbations due to ownship acceleration occur, the range-ratio existing between timelines becomes $$\frac{R_2}{R_1} = \frac{\sqrt{\left(1 + \frac{\dot{R}}{R} \cdot (T_2 - t_0) - \frac{1}{R} \cdot u_{p\|_{02}}\right)^2 + \left(\dot{\beta} \cdot (T_2 - t_0) - \frac{1}{R} \cdot u_{p\perp_{02}}\right)^2}}{\sqrt{\left(1 + \frac{\dot{R}}{R} \cdot (T_1 - t_0) - \frac{1}{R} \cdot u_{p\|_{01}}\right)^2 + \left(\dot{\beta} \cdot (T_1 - t_0) - \frac{1}{R} \cdot u_{p\perp_{01}}\right)^2}}. \quad (20)$$

For single-leg geometries, the ownship acceleration terms and go to zero and the range ratio simplifies to $$\frac{R_2}{R_1} = \sqrt{\frac{(1 + \dot{R}/R \ast (T_2 - t_0))^2 + (\dot{\beta} \ast (T_2 - t_0))^2}{(1 + \dot{R}/R \ast (T_1 - t_0))^2 + (\dot{\beta} \ast (T_1 - t_0))^2}}. \quad (21)$$

Note that this expression is functionally dependent upon only the relative motion components of the MP state vector. With timeline bearings given from the mapping defined above, the Modified Polar relative motion solution maps to the Modified Endpoint relative motion solution as below.

$$x_{MP}(t_1, t_2) = [\ \beta_1 \quad \beta_2 \quad R_2/R_2\ ] \quad (22)$$

Here, only the first three terms of the Modified Endpoint estimate are observable based upon data collected prior to an ownship maneuver.

Recognizing that a relative motion flyby geometry produces a zero range-rate when the contact is at its closest point of approach (CPA), then the time to CPA can be computed from the relative motion solution even though the range may be unknown. To see this, the update equation for range normalized range rate is rewritten in the form $$\dot{R}/R^{(tCPA)} = \frac{\dot{\beta} \cdot (\dot{\beta} \cdot \Delta T_{CPA}) + \dot{R}/R \cdot (1 + \dot{R}/R \cdot \Delta T_{CPA})}{(1 + \dot{R}/R \cdot \Delta T_{CPA})^2 + (\dot{\beta} \cdot \Delta T_{CPA})^2} \quad (23)$$

where $\Delta T_{CPA} = t_{CPA} - t_0$, the time difference between the time of CPA and reference time. The projected CPA presumes ownship to maintain current course and speed; hence, acceleration perturbations are set to zero. Setting range rate at CPA to zero and solving for ATCPA yields $$\Delta T_{CPA} = \frac{-\dot{R}/R}{(\dot{R}/R)^2 + (\dot{\beta})^2}. \quad (24)$$

Substituting this formulation into the range ratio expression above yields $$R_{CPA} = R \ast \sqrt{(1 + \dot{R}/R \cdot \Delta T_{CPA})^2 + (\dot{\beta} \cdot \Delta T_{CPA})^2} \quad (25)$$

$$= R \ast \frac{\dot{\beta}}{\sqrt{(\dot{R}/R)^2 + (\dot{\beta})^2}}$$

Let the Direction of Relative Motion (DRM) of the target be defined relative to the line-of-bearing as $$DRM = \tan^{-1}\left(\frac{\dot{\beta}}{\dot{R}/R}\right), \text{ with } \sin(DRM) = \frac{\dot{\beta}}{\sqrt{(\dot{R}/R)^2 + (\dot{\beta})^2}}. \quad (26)$$

Then the ratio between timeline and CPA ranges simplifies to $$\frac{R_i}{R_{CPA}} = \frac{1}{\sin(DRM_i)} \quad (27)$$

Now with the relative course with respect to due North, $C_{rel} = DRM + \beta$, the range-ratio between timelines is given by $$\frac{R_2}{R_1} = \frac{\sin(DRM_1)}{\sin(DRM_2)} = \frac{\sin(C_{rel} - \beta_1)}{\sin(C_{rel} - \beta_2)}. \quad (28)$$

Each of these transformations has physical significance with respect to single-leg TMA, and is illustrated in FIG. 1.

Figure 2A:
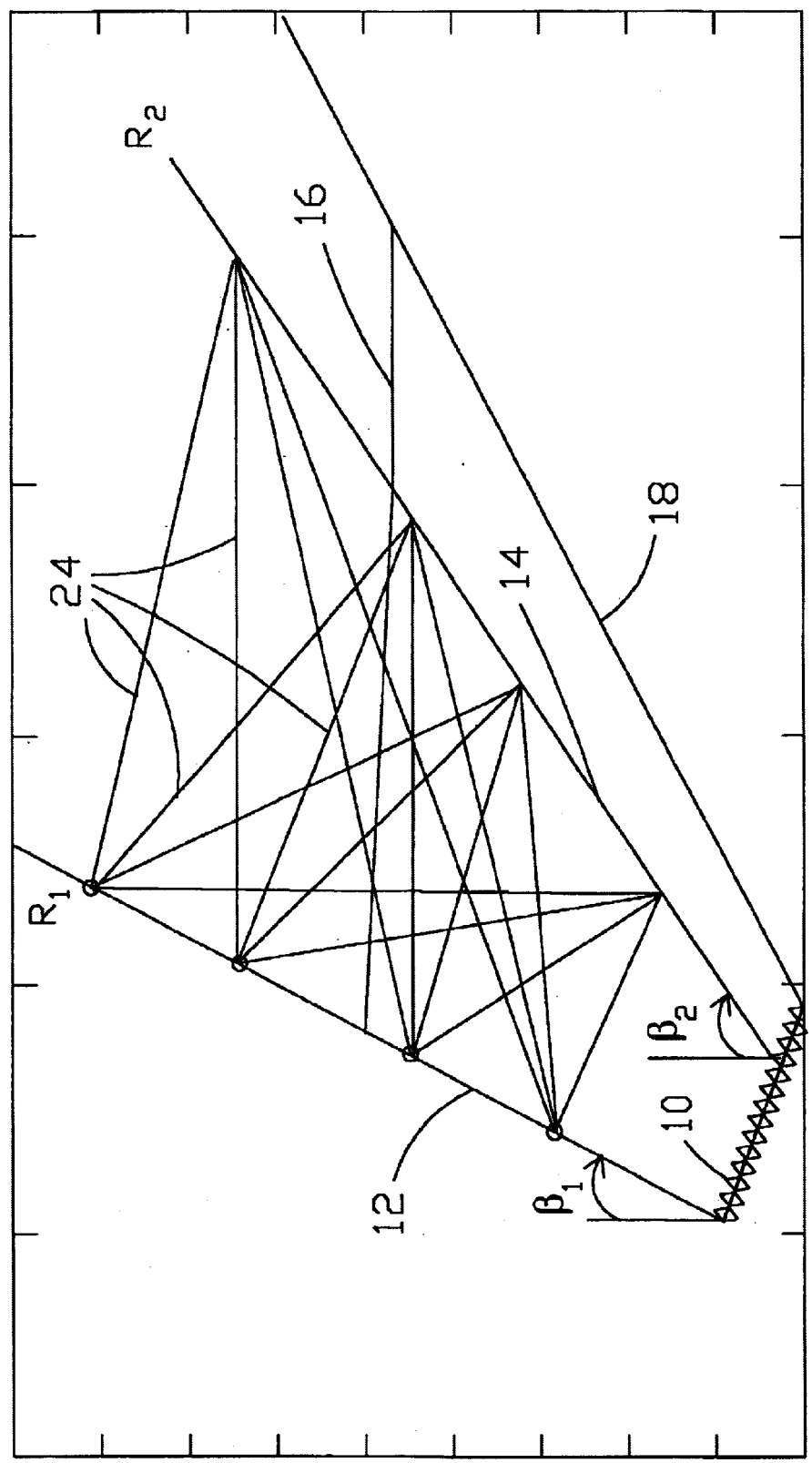
FIG. 2A is an example of hypothesized possible target tracks for a parameter evaluation plot (PEP) in accord with prior art methods.
Figure 2B:
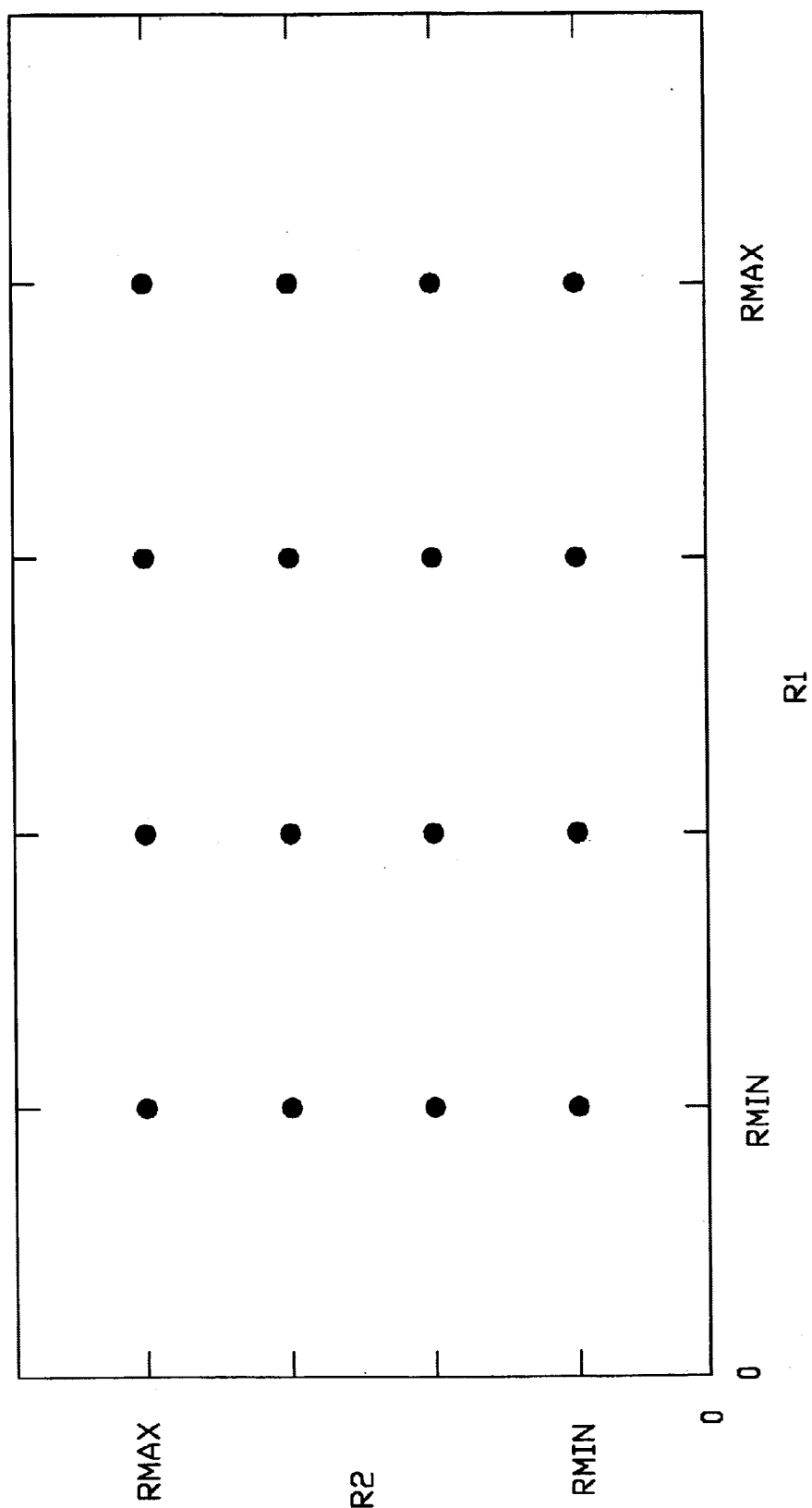
FIG. 2B discloses an example of a prior art uniform grid in an $R_1$–$R_2$ coordinate space for use in the prior art PEP technique.

As mentioned earlier, the parameter evaluation plot (PEP) is a computer-based conventional grid-search technique for estimating the position and velocity of an underwater contact from acoustic measurements. The PEP employs the end-point coordinate system i.e., range and bearing at Time-lines 1 and 2, and automatically computes and evaluates a Rood Mean Squared (RMS) cost function over numerous hypothesized constant-velocity target trajectories. The optimal target track (or TMA solution) is defined as the trajectory with the lowest RMS cost. A geographic display of possible trial tracks 24 for the PEP is shown in FIG. 2A, and the mathematics is described as follows. The PEP computes a mathematical cost function for measuring the fit to the observed bearing data for a set of constant-velocity target trajectories. Suppose the $\{Z_1, Z_2, \ldots Z_N\}$ is the set of N bearing observations on the recognized target where $t_n$ is the time of the nth observation for $n = 1, 2, \ldots N$. The PEP searches over an interval of ranges $[R_{min}, R_{max}]$ at the timeline $T_1 \equiv t_1$ of the first observation and the same interval of ranges $[R_{min}, R_{max}]$ at the timeline $T_2 \equiv t_N$ of the Nth observation. The PEP employs a uniform grid in the so-called $R_1$–$R_2$ space, which is depicted in FIG. 2B. Each pair of ranges $+R_1, R_2$, along with the "tiedown bearings" $+\beta_1, \beta_2$, at times $T_1$ and $T_2$ defines a constant-velocity track that passes through the points $(R_1(T_1), (\beta_1, (T_1))$ and $(R_2 (T_2), (\beta_2(T_2))$. The tiedown bearings $\beta_i$ may be set equal to the measurements $Z(T_i)$ or to some locally smoothed value of bearings about $T_i$ for better stability. Ownship motion is arbitrary but assumed known, i.e. position of the sensor platform is uniquely defined at all observation times.

Recall that for tiedown bearings $+\beta_1, \beta_2$, each sample-point $+R_1, R_2$, represents a possible constant-velocity tracking solution with goodness-of-fit evaluated as follows. Let $\hat{Z}_n$ and $\hat{R}_n$ be the predicted bearing and range of this track at observation time $t_n$ Ŝ and Ĉ be the speed and course of the target corresponding to this track The PEP computes a cost associated with each hypothesized track. One standard cost function is the RMS error between the observed measurements and the predicted bearing produced along the track. This is $$Cost_{RMS}(R_1, R_2) = \sqrt{\frac{1}{N}\sum_{n=1}^{N}(Z_n - \hat{Z}_n)^2}. \quad (29)$$

This function is displayed as a surface plot in $(R_1, R_2)$ space. The low cost regions of this surface correspond to high likelihood regions for the target, with the minimum cost track designated as the selected TMA solutions. This function is a "single-error-component" cost function, i.e., the cost function is represented by an equation, which basically consists of one measurement error computing equation element.

An intelligent PEP in accord with the present invention is capable of providing (but not restricted to) single-leg tracking information through the use of ancillary data on threat and sensor characteristics, while imbedding the uncertainty management necessary to represent tracking solution ambiguity when it exists. It does this through an efficient smart grid in endpoint coordinates for finding the minimum of an augmented cost function. The design is intended to function in conjunction with a modified polar batch processor, which is used to fair the measurement data for tiedown bearing selection and to derive features such as range-ratio to regulate the PEP search as discussed hereinbefore.

Figure 3:
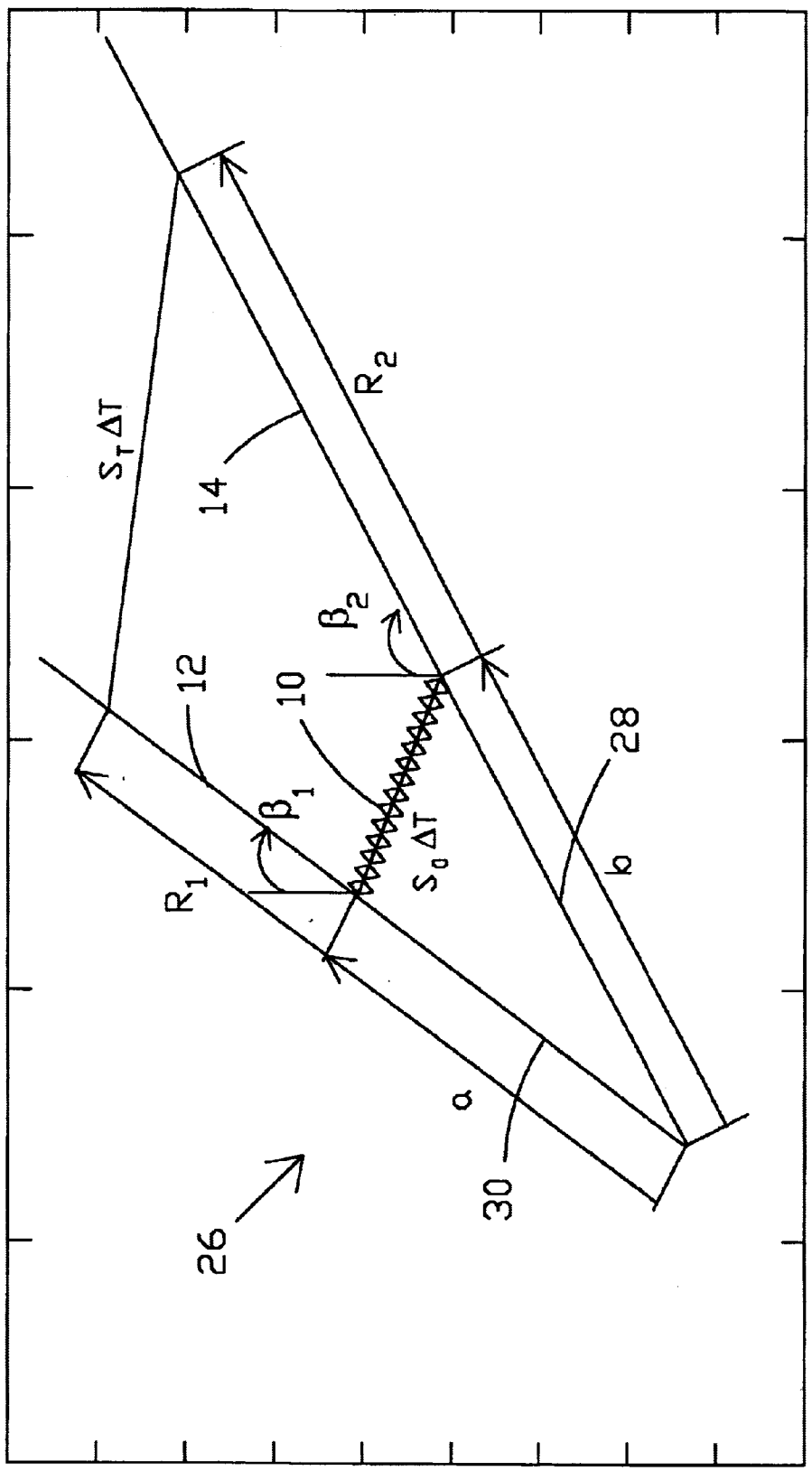
FIG. 3 discloses an example of an extrapolated triangle of timeline bearings in geographic coordinates which may be utilized for producing a speed ellipse in an $R_1$–$R_2$ coordinate space accord with the present invention.

An intelligent PEP in accord with the present invention limits the range-sampled search space to achieve improved computational efficiency. This is done by concentrating the samples in appropriately defined regions of the search space, such that only plausible target tracks satisfying (i) a maximum platform speed constraint, and (ii) estimated range-ratio and the spread in range-ratio (if available) are considered. The resultant effect is to provide increased sampling resolution in the plausible regions of the search space, focusing in particular on the area where the cost function is the minimum. In a smart grid in accord with the present invention, the locus of all constant speed trial tracks from $\beta_1(T_1)$ to $\beta_2(T_2)$ is described by an ellipse in the R1–R2 coordinate space. This result is derived by application of the law of cosines to the triangle formed by the timeline 1 bearing, timeline 2 bearing (extrapolated if necessary to form an intersection) and any hypothesized track of speed ST from $\beta_1(T_1)$ to $\beta_2(T_2)$. An example of a triangle, such as extrapolated triangle 26 with extrapolated timeline bearings 28 and 30, used for this purpose is illustrated in FIG. 3. The speed ellipse is parameterized as follows:

$$(R_1+a)^2+(R_2+b)^2-2*(R_1+a)*(R_2+b)*\cos \Delta\beta=(S_T\Delta T)^2 \quad (30)$$

where time difference, $\Delta T=T_2-T_1$, bearing difference, $\Delta\beta=\beta_1-\beta_2$ (between timelines) R1-axis offset, $$a = S_0\Delta T * \frac{\sin(C_0 - \beta_2)}{\sin\Delta\beta}$$

and R2-axis offset, $$b = S_0\Delta T * \frac{\sin(C_0 - \beta_1)}{\sin\Delta\beta}.$$

Figure 4:
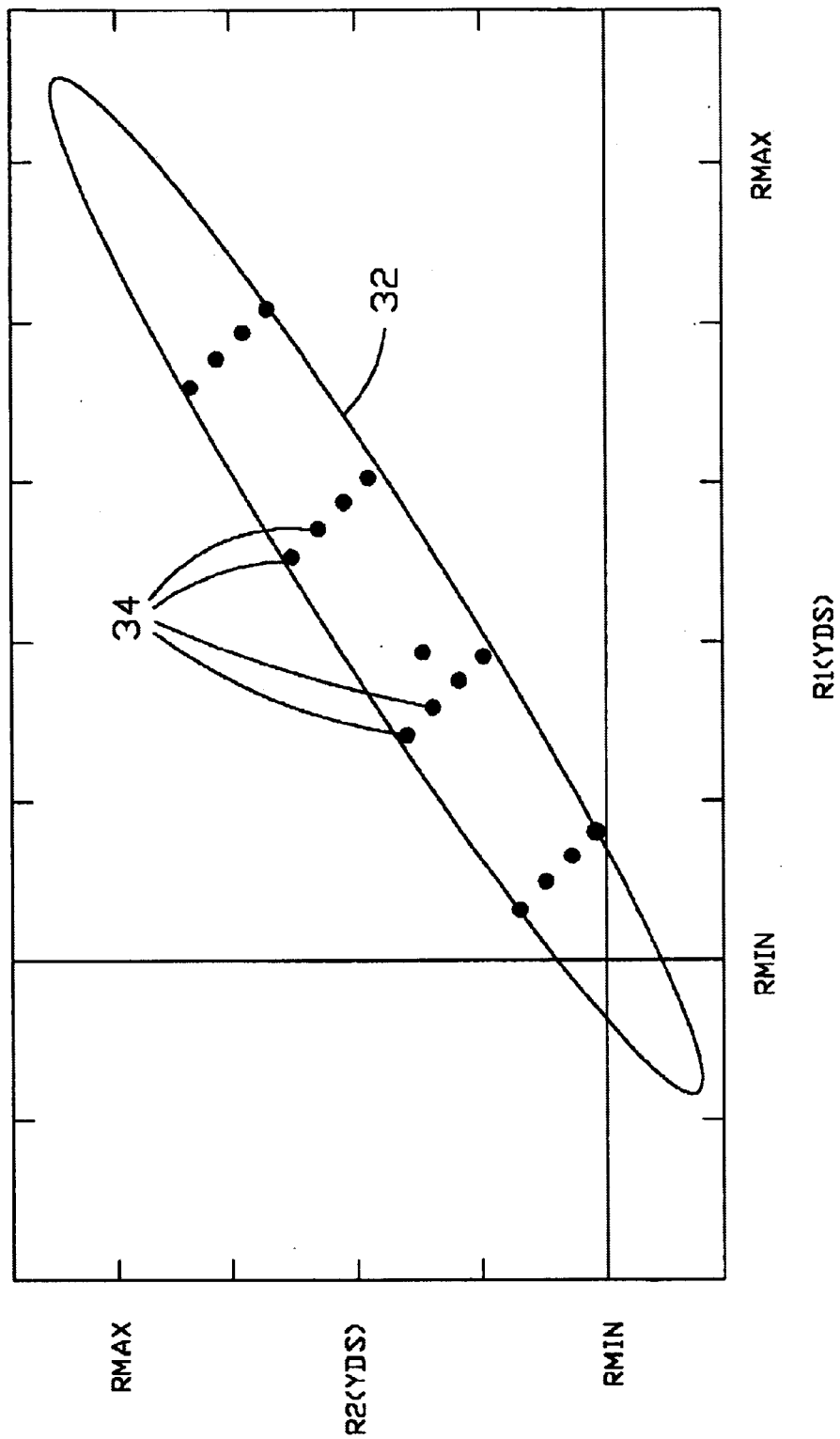
FIG. 4 discloses a speed ellipse constraint corresponding to a maximum speed of 25 knots within an $R_1$–$R_2$ coordinate space in accord with the present invention.

Hence, if $S_M$ is the maximum hypothesized target speed, all feasible tracks with speed less than the maximum are contained within the speed ellipse described by $S_M$ in the R1–R2 coordinate space. An example speed ellipse constraint 32 is illustrated in FIG. 4, along with 16 sample points as indicated at 34 that represent trial tracks for evaluation by the intelligent PEP. The contrast in placement of these non-uniform points with the square grid of FIG. 2B is to be noted, since these samples comprise feasible tracks with speeds under 25 knots, for example.

It is worth noting that while constants $S_0$ and $C_0$ represent the ownship speed and course on a single-leg, the expressions for offsets a and b generalize to the case of arbitrary ownship motion between the timelines. Hence, given initial and final ownship positions $p_0(T_1)=[x_{01},y_{01}]^T$ and $p_0(T_{21})=[x_{02},y_{02}]^T$, the offsets are given by $$a = \tilde{D}_o * \frac{\sin(\tilde{C}_0 - \beta_2)}{\sin\Delta\beta}, \text{ and } b = \tilde{D}_0 * \frac{\sin(\tilde{C}_0 - \beta_1)}{\sin\Delta\beta} \quad (31)$$

where $$\tilde{D}_o = \sqrt{\Delta x_0^2 + \Delta y_0^2}$$

is the straight-line distance from the initial to final ownship position, with $\Delta x_0=x_{02}-x_{01}$ and $\Delta y_0=y_{02}-y_{01}$, and $\tilde{C}=_0\tan^{-1}(\Delta x_0/\Delta y_0)$ is the corresponding direction of motion, or course made good, associated with this straight line displacement.

An intelligent PEP in accord with the present invention narrows the focus the computations in the R1–R2 space by using an estimate of the range-ratio $R_2/R_1$ and the associated spread (defined as 3 times the standard deviation, $\sigma_{R2/R1}$), if that parameter is available. The caveat of availability derives from the observability characteristics of single-leg bearings-only TMA. As noted previously, this estimation problem is commonly associated with lack of observability in range. However, for a noisy measurement sequence, increasing levels of observability are required to estimate higher-order features beyond bearing with acceptable solution uncertainty. That is, to estimate MP parameters such as bearing-rate and normalized range-rate with reasonable confidence limits, progressively larger amounts of data are required with lower feature-strength to measurement-noise.

In our formulation, range-ratio is computed via propagation of the MP state estimate from a current time solution to estimates at the respective Endpoint timelines, and forming the ratio directly from the inverse range estimates. That is $$\frac{R_2}{R_1} = \frac{x_{MPA}(T_1)}{x_{MPA}(T_2)} = \frac{1/R_1}{1/R_2}. \quad (32)$$

The standard deviation of this parameter, $\sigma_{R2/R1}$, is calculated using the linearized mapping of the current time MP state error covariance matrix, $P_{MP}(t_0)$, to the range ratio parameter space as $$\sigma_{R_2/R_1} = \sqrt{H\Phi(t_0, T_1)P_{MP}(t_0)\Phi(t_0, T_1)^T H^T} \quad (33)$$

where $\Phi(t_0,T_1)P_{MP}(t_0)\Phi(t_0,T_1)^T$ represents a propagation of the MP state error covariance from current-time to timeline 1 with $\Phi(t_0,T_1)$ denoting the state transition matrix defined hereinbefore, and H represents the gradient of range ratio with respect to timeline 1 MP estimate. As discussed earlier herein, a preferred source of an R2/R1 estimate is through mathematical manipulation that maps Modified Polar estimates to range-ratio estimates. Employing this technique, the functional dependency of range ratio on the timeline 1 MP state takes the form $$\frac{R_2}{R_1} = \sqrt{\left(1 + \frac{\dot{R}}{R}\cdot \Delta T_{12} - \frac{1}{R}\cdot u_{p\| \;|12}\right)^2 + \left(\beta\cdot \Delta T_{12} - \frac{1}{R}\cdot u_{p\perp 12}\right)^2} = \sqrt{\alpha_1^2 + \alpha_2^2} \quad (34)$$

where $\Delta T_{12}$ and $u_{12}$ refer to the time difference and ownship acceleration components between the timelines. The gradient vector H is derived from this relation and takes the form $$H = \frac{\partial \frac{R_2}{R_1}}{\partial x_{MP}(T_1)} = \left[(\alpha_1 u_{p\| \;|12} - \alpha_2 u_{p\perp 12})\frac{1}{R_1} \;\; \alpha_1\Delta T \;\; \alpha_2\Delta T \;\; (\alpha_1 u_{p\perp 12} - \alpha_2 u_{p\| \;|12})\right]\cdot \frac{R_1}{R_2}. \quad (35)$$

In R1–R2 space, the estimated range-ratio (or sometimes simply "RR") and associated spread $$m = R_2/R_1 \pm 3*\sigma_{R_2/R_1} \quad (36)$$

define straight lines of the type $R_2=mR_1$ passing through the origin. These lines form an asymmetric wedge in relation to the ellipse, which is called the "range-ratio wedge." From a kinematics point of view, the range-ratio wedge is equivalent to imposing direction of relative motion (DRM) or relative course constraints on target motion.

An intelligent PEP in accord with a preferred embodiment of the invention uses a smart grid (which is nonlinear in nature) to sample the intersection of the two constraint regions described above. The estimated range-ratio line in $R_1$–$R_2$ space is also sometimes called the "RR line," or the "primary axis of the intersection region." The sampling methodology is based on the following:

(i) Samples are clustered about range tiedown points that are uniformly spaced along the range-ratio (RR) line of the intersection region (denoted as range cluster), and (ii) Within a range cluster, the samples encompass the spread of the intersection region in a direction orthogonal to this primary axis.

The range tiedown points are also sometimes called the "primary ranges."

Figure 5:
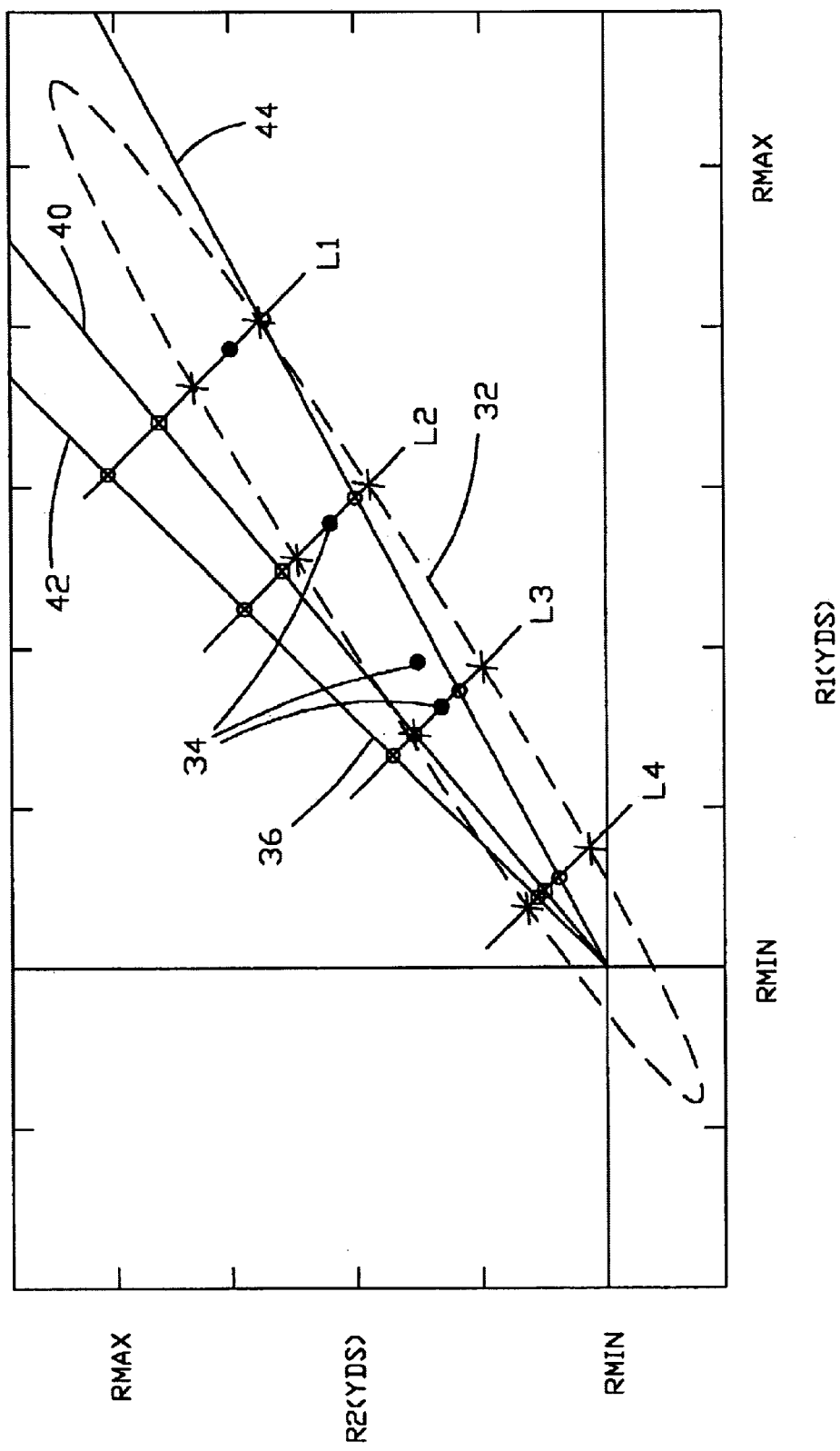
FIG. 5 discloses range-ratio wedge and speed ellipse constraints for a grid in an $R_1$–$R_2$ coordinate space in accord with the present invention.

An example region formed by the intersection of speed ellipse 32 and the range-ratio (RR) wedge 36 defined by Max RR limit 42 and Min RR limit 44 is illustrated in FIG. 5. Grid samples, such as samples 34 in this region are representative of a sampling process step performed as described above. The grid takes the form of Cartesian coordinates with $R_1$, the range along the abscissa at an initial-time $T_1$, and $R_2$ the range along the ordinate at end-time $T_2$. The primary range datums are the intersections of orthogonal direction lines L1, L2, L3, L4 with RR line as indicated at 40. In further detail, these intersections of the orthogonal direction lines L1–L4 with the range-ratio wedge are indicated in FIG. 5 by box symbols for intersection with RR line 40, "x" symbols for intersection with ellipse 32, and "O" symbols for intersection with wedge 36 defined by max RR limit 42 and minimum RR 44 limit, respectively. The individual samples 34 are represented by dots along the portion of orthogonal direction lines L1–L4 encompassing the spread of the intersection region along these lines.

Figure 6:
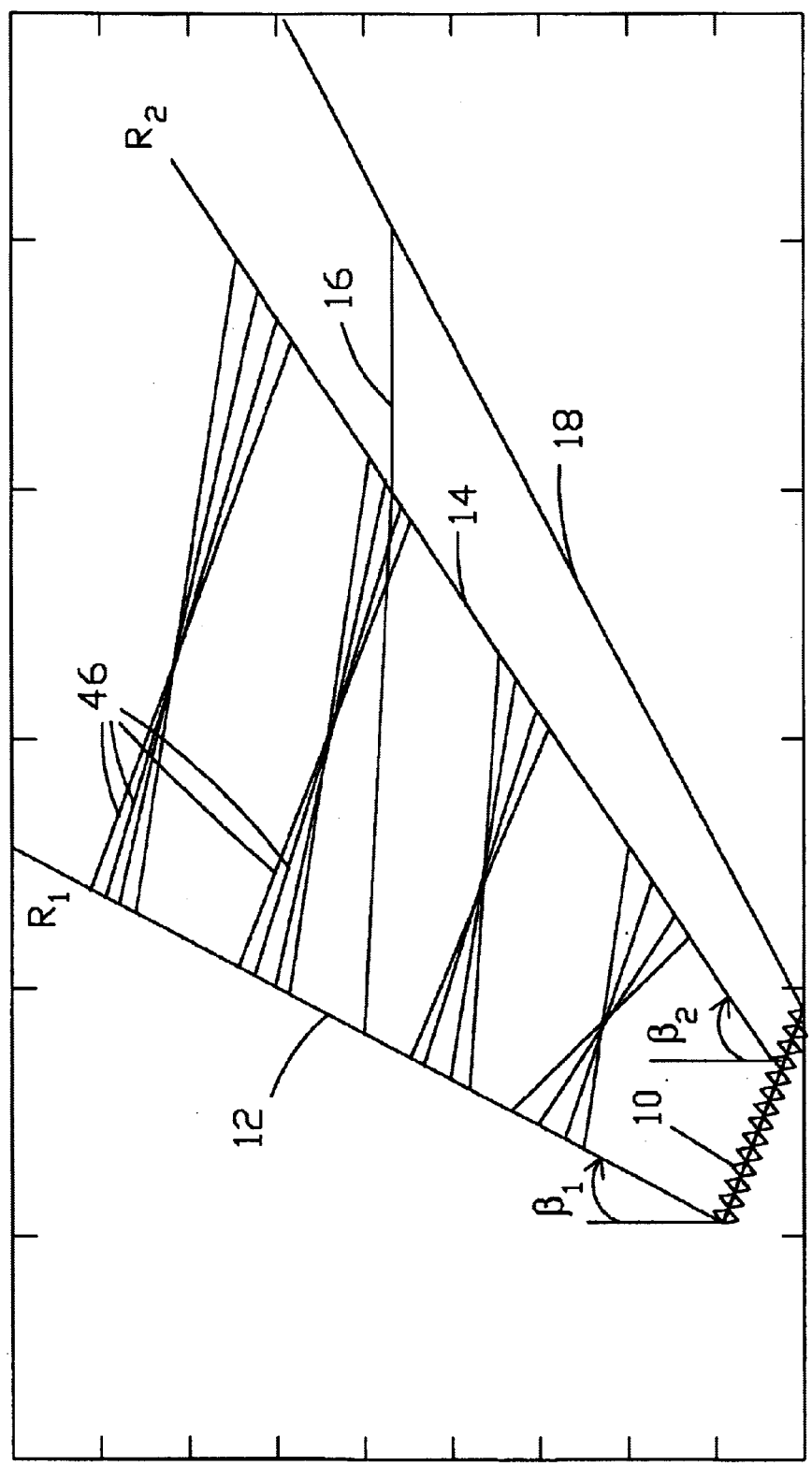
FIG. 6 discloses a geographic plot of trial tracks defined by the grid constrained as indicated in FIG. 5 in accord with the present invention.

The corresponding geographic plot with trial target tracks 46 is shown in FIG. 6, and is to be contrasted with the hypothesized trajectories of FIG. 2A. These trial tracks satisfy the kinematics motion constraints of maximum speed and DRM limits that were originally imposed in the R1–R2 coordinate space. Thus, the trial solutions from the Intelligent PEP constitute an efficiently constrained subspace of all possible constant-velocity trajectories commencing at the Timeline1 bearing and terminating at the Timeline2 bearing.

As mentioned earlier herein, the intelligent PEP is capable of single-leg tracking through the instrumentality of an efficient smart grid for finding the minimum of an augmented cost function. A preferred basic cost component of the augmented cost function is the standard deviation weighted sum-squared measurement error. The equation shown directly below is a mathematical statement of this function, stated in the form of a "single-error-component" cost function. Notice the explanatory note identifying the equation element, which is based upon bearing measurements.

$$J(R_1, R_2) = \sum_{n=1}^{N} \overbrace{\frac{(Z_n - \hat{Z}_n)^2}{\sigma_n^2}}^{\text{based upon bearing measurements}} \quad (37)$$

Here, $\sigma_n$ is the standard deviation of the measurement error distribution, which is assumed to be Gaussian with zero mean and independent for each observation. The so-called "$\Delta J$" cost function is then defined as the differential cost with respect to the minimal cost over all the hypothesized tracks, and is $$Cost_{delJ}(R_1, R_2) = \Delta J = \sqrt{J(R_1, R_2) - J_0}, \text{ where} \quad (38)$$

$$J_0 = \min_{\forall (R1,R2)} J(R_1, R_2)$$

The track likelihood function is defined in terms of this cost function as $$L(R_1,R_2)=\exp(-0.5*Cost_{delJ}(R_1,R_2)^2) \quad (39)$$

It is worth noting that the optimal solution will have a maximum likelihood of 1.0, and that all other tracks will have likelihood in the interval 0-1. The $\Delta J$ cost for any other track then represents a standard deviation weighted distance from this zero-mean, e.g. $\text{Cost}_{delJ}(R_1,R_2)=2$ indicates a possible solution point 2-σ from the optimum.

The augmented cost function is a triple-error-component cost function. In addition to the error component based upon bearing data, it includes two other error components. The bases of the latter two components are: (i) a prior (a priori) likelihood function on target speed; and (ii) a priori anchor range likelihood function on expected maximum initial detection target range at timeline1. The equation shown directly below is a mathematical statement of this triple-error-component, enhanced, cost function. Notice the explanatory notes identifying the type of data associated with the respective equation elements.

$$J^*(R_1, R_2) = \sum_{n=1}^{N} \overbrace{\frac{(Z_n - \hat{Z}_n)^2}{\sigma_n^2}}^{\text{based upon bearing measurement t}} + \tag{40}$$

$$\underbrace{\frac{(\hat{S} - S_0)^2}{\sigma_s^2}}_{\text{based upon speed data}} - \overbrace{2 \ln L_{AR}(R_1)}^{\text{based upon initial target range data}}$$

Figure 7A:
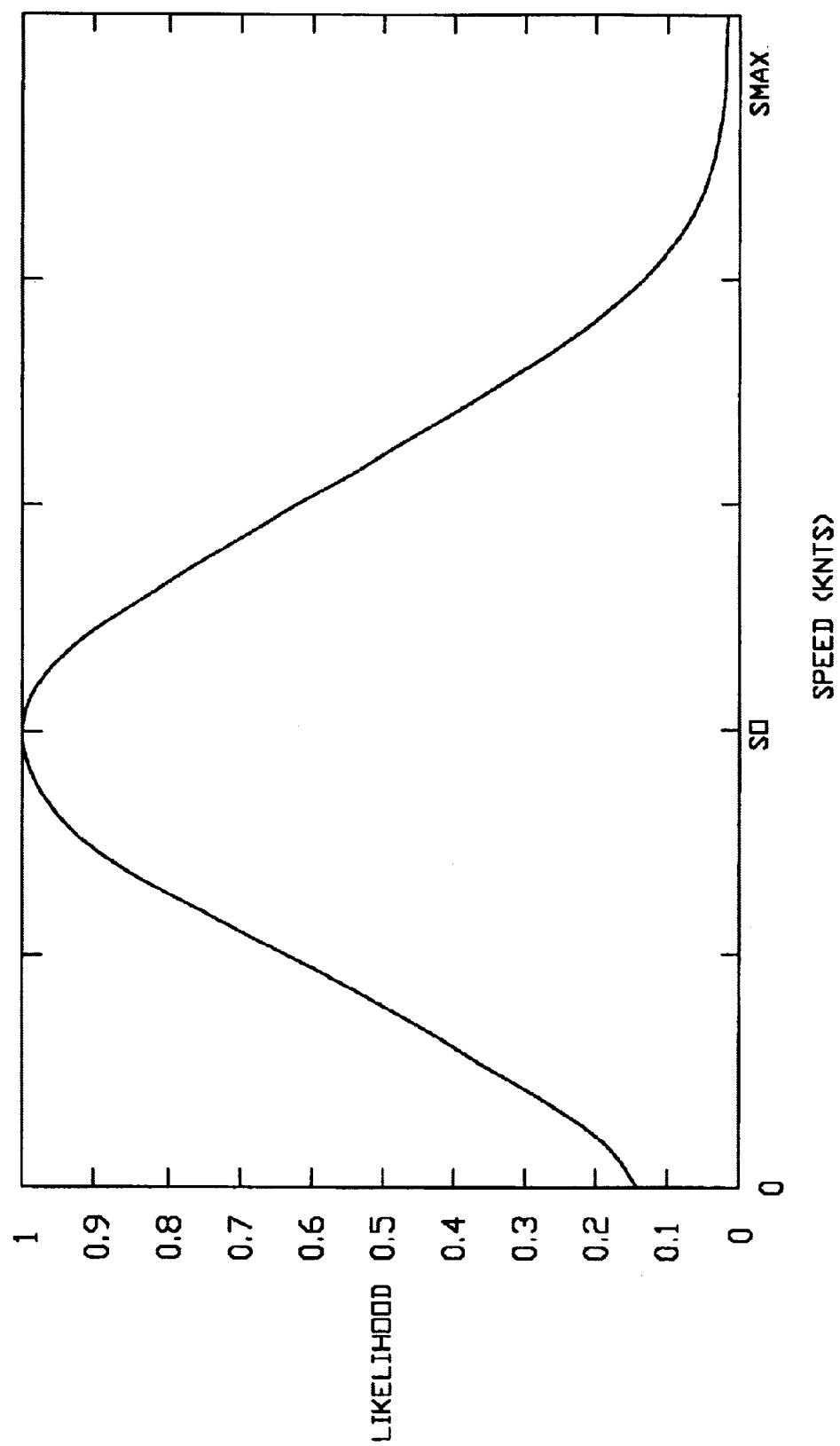
FIG. 7A is a graph of likelihood of target speed in accord with the present invention.
Figure 7B:
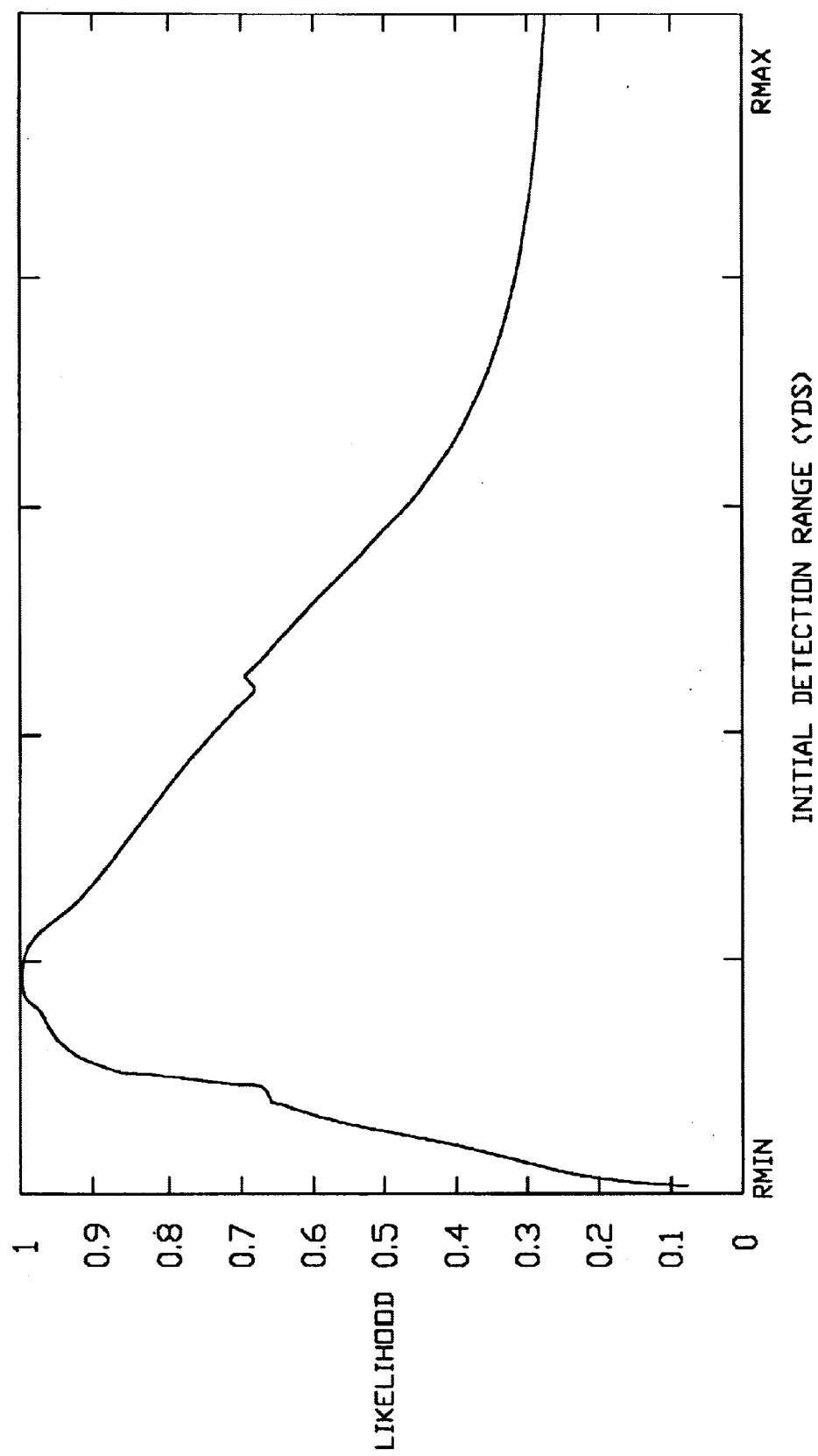
FIG. 7B is a graph of likelihood of initial detection range of a target based on range of the day likelihood in accord with the present invention.

Here, $S_0$ and $\sigma_s$ are the mean and standard deviation of the prior knowledge likelihood function on target speed, and $L_{AR}(R_1)$ is the anchor range likelihood function. If T1 is the time of initial detection, the expected range at initial detection, (i.e., the prior knowledge range-of-the-day likelihood function) describes the anchor range function. This function is given by $$L_{AR}(R_1) = K^* p_d(R_1)^* (1-p_d(R_1)) \tag{41}$$

where $p_d(R_1)$ is the instantaneous probability of detecting the target at range $R_1$, and K is a scaling constant chosen so that the maximum of the range-of-the-day likelihood is equal to 1. An example of a prior knowledge speed likelihood function for an underwater contact is shown in FIG. 7A, and a typical prior knowledge range-of-the-day likelihood function for initial detection range is depicted in FIG. 7B. For example, the prior knowledge target speed function may be based upon experience in terms of known behavior of certain classes of targets in certain tactical situations. The range-of-the-day likelihood function may be based upon environmental characteristics in the region of operation (e.g., a region of an ocean in a certain month.) The new Augmented Cost Function ΔJ* is thus $$\text{Cost}^*_{delJ}(R_1, R_2) = \Delta J^* = \sqrt{J^*(R_1, R_2) - J_0^*}, \text{ where} \tag{42}$$

$$J_0^* = \min_{\forall (R1,R2)} J(R_1, R_2)$$

The new track likelihood function is then $$L^*(R_1,R_2) = \exp(-0.5^* \text{Cost}^*_{delJ}(R_1,R_2)^2).$$

The intelligent PEP has two primary advantages over the PEP: (i) the search space of trial target tracks is focused on the subspace formed by intersection of the maximum speed ellipse and the range-ratio wedge, and (ii) the cost function is augmented to include additional components based on a priori target speed information and anchor range likelihood. This results in a highly efficient search in the region of feasible solutions, and concentrates on the subset of plausible target tracks that are consistent with the measured data and the input speed constraints. By concentrating the search to this subset, a very much smaller number of sample points is required by the smart grid of the intelligent PEP as compared to the uniform grid of the PEP. In contrast, the uniform grid of the PEP is markedly inefficient in that a significant number of the solutions being evaluated are either physically impossible (e.g. speeds of 50 knots or greater) or do not reasonably use the available information (e.g. courses that are incompatible with measured data.)

Figure 8:
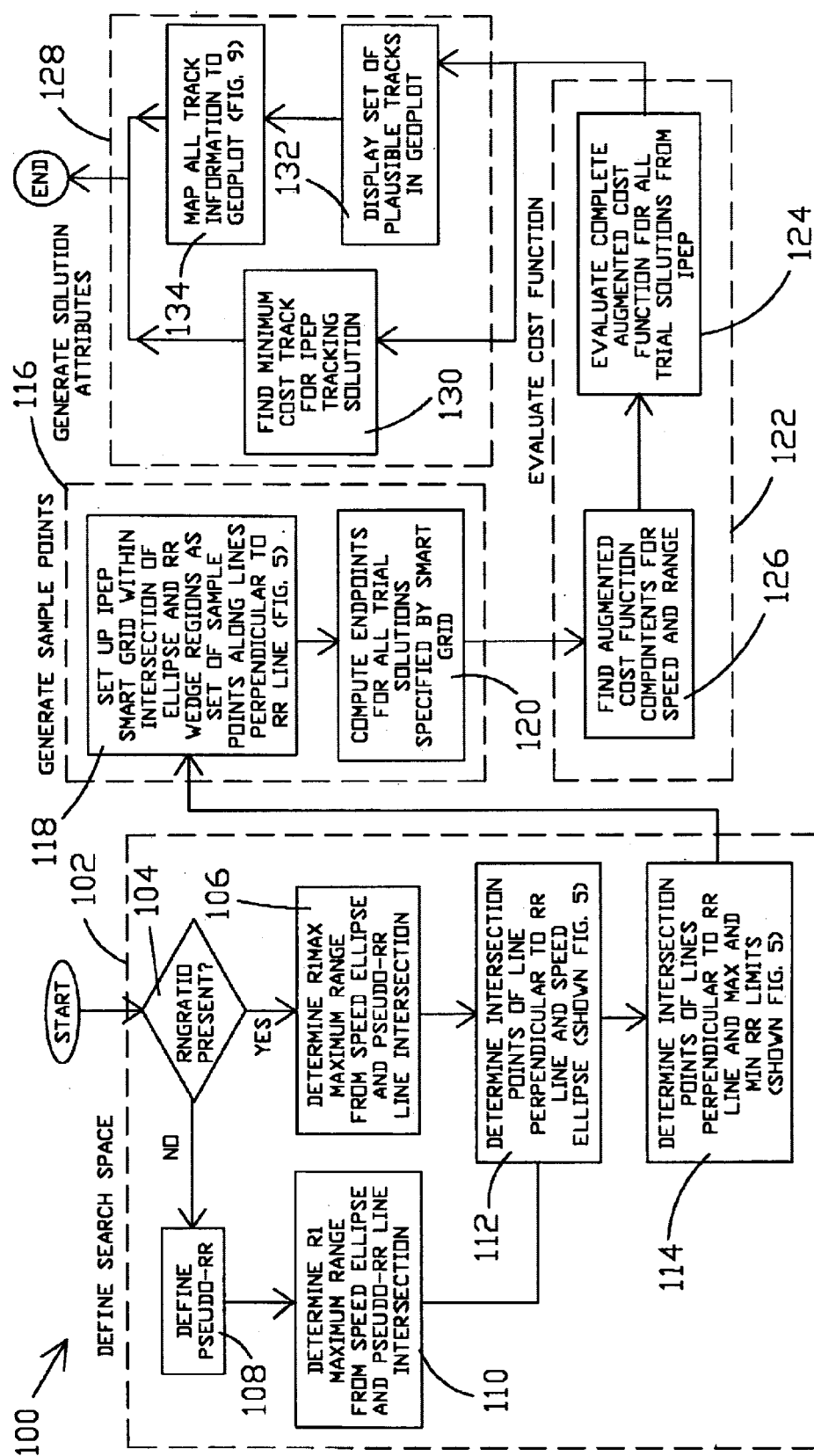
FIG. 8 is a block diagram of information flow in an intelligent parameter plot (IPEP) technique in accord with the present invention.

A block diagram of a presently preferred information flow method 100 in an intelligent PEP ("IPEP") is shown in FIG. 8. FIG. 8 depicts information flow method 100 that occurs in the mode of operation of a Target Motion Analysis (TMA) system which employs the intelligent PEP. Stated another way, information flow method 100 discloses a presently preferred embodiment of process of the present invention. A block diagram and descriptive text of presently preferred system 200 of the present invention is set forth in FIG. 11, which is discussed hereinafter.

Information flow method 100 occurs in the following sequence as indicated. Preferably, the first function to be performed is to fully define the boundaries within which to search the R1–R2 parameter space as indicated generally at 102. As suggested at decision block 104, if knowledge of DRM is provided, then a corresponding range-ratio wedge is constructed from it as indicated at 106. If no DRM information is provided, then pseudo-range ratio (i.e., pseudo-RR) 108, arbitrarily set to a value of one, is applied to determine the range extent of speed ellipse 32 down this range ratio line. This corresponds to determining a range extent, as indicated at 110, from speed ellipse 32 shown in FIG. 4. In either case, the lateral limit of lines perpendicular to range ratio line 44 (See FIG. 5) is determined as indicated at 112 and 114. With these boundaries specified, the set of R1–R2 grid points 34 are established as indicated at 116. These points are determined by sampling down and then across the range ratio line as indicated at 118. Each R1–R2 sample point 34 along with the endpoint tiedown bearings defines a plausible target trajectory, and the endpoints of these plausible tracks are calculated in geo-spatial coordinates as indicated at 120.

The next function is to evaluate the cost function, as indicated at 122, for each of the plausible tracks. Then, the goodness-of-fit of the sequence of measurement data to each plausible trajectory is calculated and aggregated into the overall cost function as indicated at 124. This measurement set is comprised of all bearing data on a given contact, and includes numerous data points in addition to timeline bearing 1 and timeline bearing 2, included points intermediate the timeline bearing and may include points observed prior to timeline bearing 1 as indicated at 126. Once the complete cost function is determined in module 122, then solution attributes module 128 may be utilized to provide various solutions. For instance, minimum cost point estimate tracking, as indicated at 130 is determined, and the set of tracks comprising the solution AOU as indicated at 132 are determined, and provided for depiction on the geographic display as indicated at 134.

Figure 9:
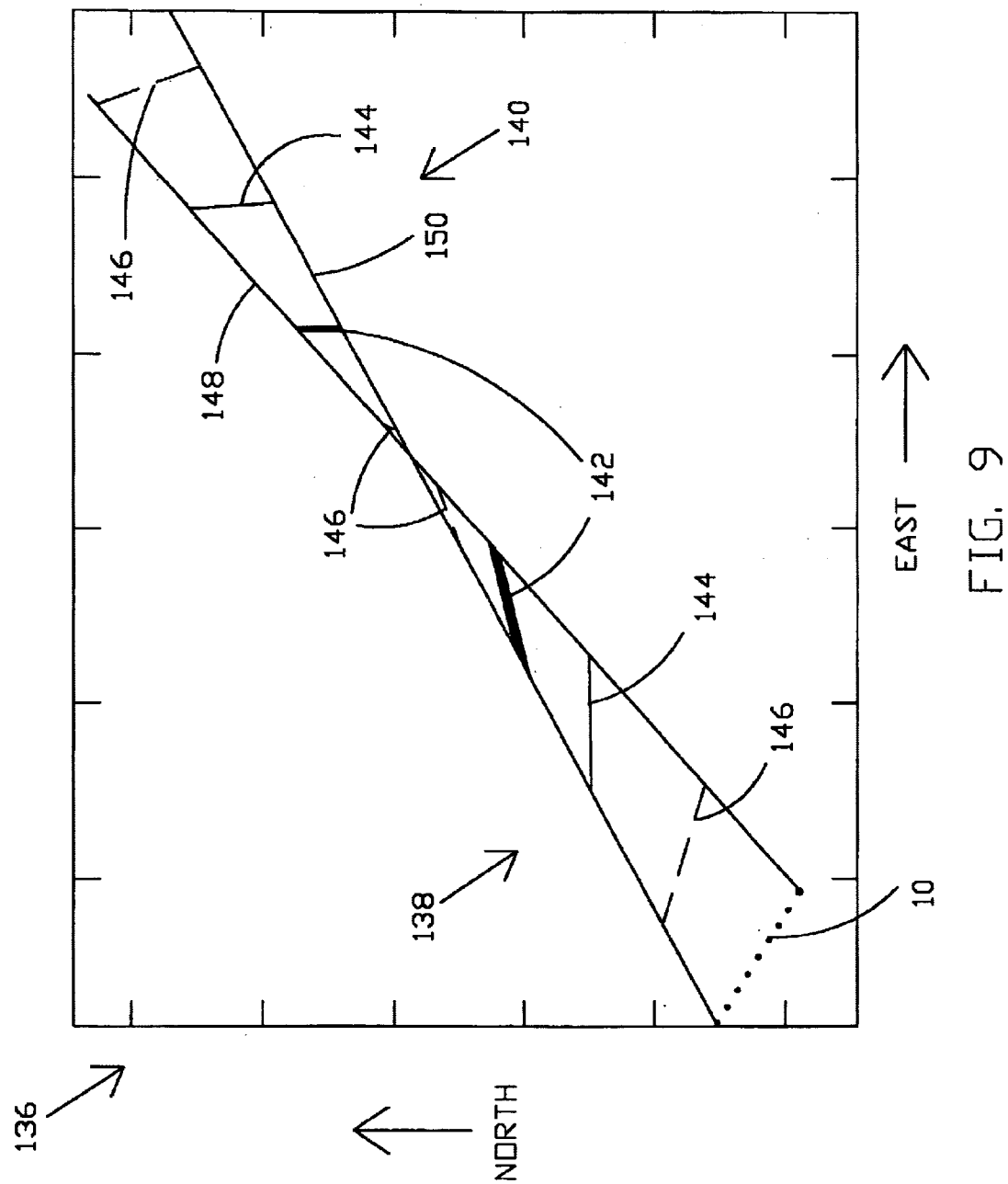
FIG. 9 is a geographic display of hypothesized target tracks depicted in a manner to indicate the solution likelihood of the hypothesized target track.
Figure 10B:
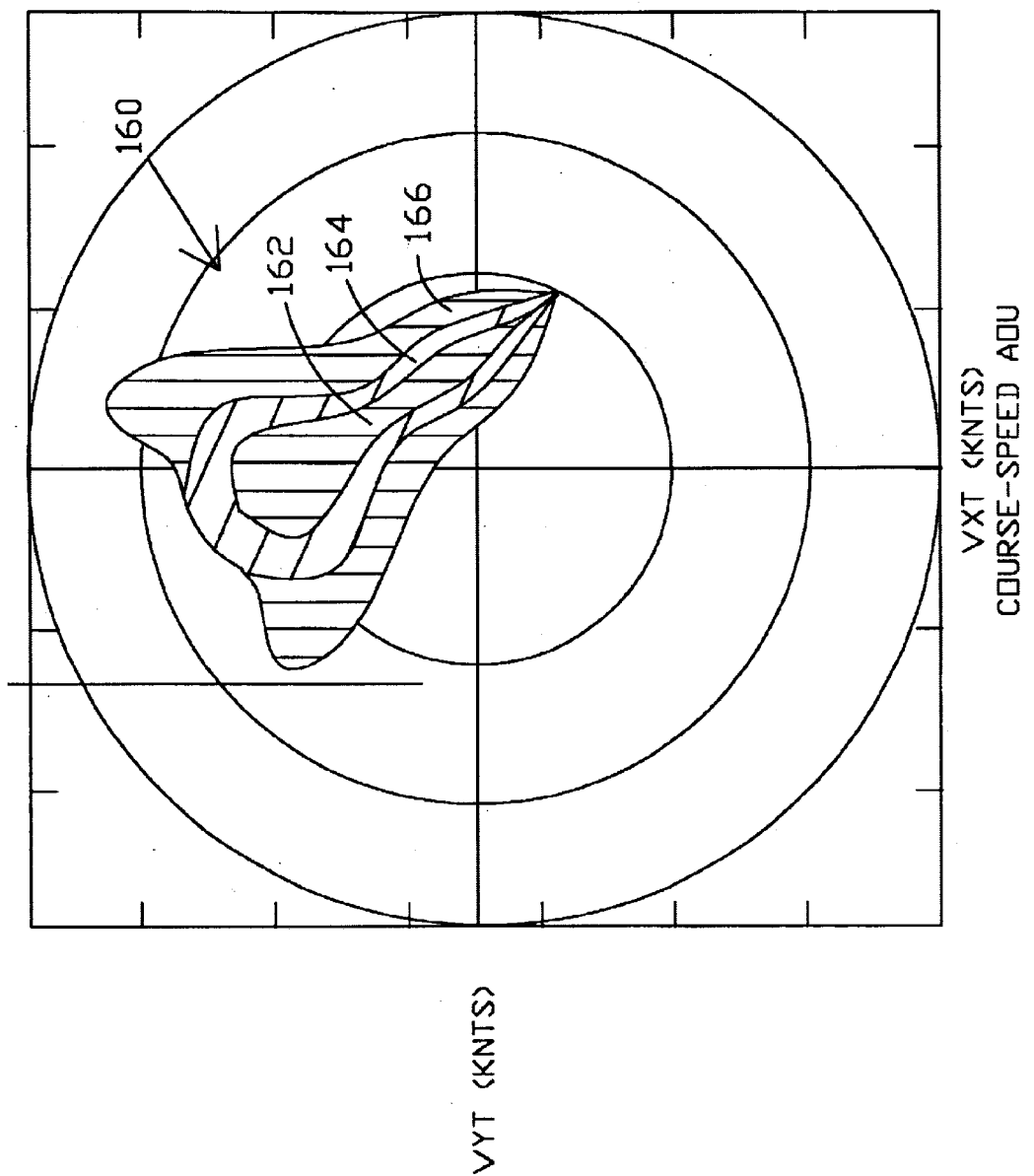
FIG. 10B is a graph showing a course speed area of uncertainty (AOU) plot within a velocity coordinate system in accord with the present invention.

The PEP cost function is conventionally displayed as a surface-plot in R1–R2 coordinates, providing the TMA operator with a quick visual indicator of solution convergence and parameter sensitivity with respect to endpoint ranges. (However, the spread or surface plot of the AOU for the example scenario shown in FIG. 9 is too narrow to show in the scale of that Figure. It is to be understood that it includes a bimodal grouping of the solution track similar in shape to the bimodal grouping shown in the surface plot of an endpoint AOU cost function in R1–R2 coordinates shown in FIG. 10A.) An innovative new feature of the Intelligent PEP is to display the same cost function in target velocity or $V_x$–$V_y$ coordinates, which is possible since every sample in R1–R2 space represents a trial track with a hypothesized course and speed. This surface plot then effectively depicts an Area of Uncertainty (AOU) in target velocity space, and is called the course-speed AOU as shown in FIG. 10B. In addition to the highest-likelihood tracking solution velocity, it provides a quick visual image of the associated uncertainty in that solution's course and speed.

Geographic display 136, shown in FIG. 9, provides an example scenario for hypothesized target tracks as generated by the intelligent PEP. In this scenario, there are 2 solution regions for this geometry, (i) a close-in set of tracks with velocities heading East or course about 90 degrees as indicated at 138, and (ii) a longer range set of tracks with velocities heading North or course about 0 degrees as indicated at 140. Timeline 1 bearing 148 and timeline 2 bearing 150 define the range of interest. These tracks are depicted by several different thicknesses and a stroke of line representation likelihood, or cost. The high likelihood track solutions are depicted by continuous thick lines, as indicated at 142. Medium likelihood tracks, as indicated at 144, and low likelihood tracks, as indicated at 146 are depicted by continuous thin lines and thin broken lines made up of short dashes, respectively. Ownship track 10 is depicted by a line made up of dots. Alternatively, the tracks may be color-coded, or may be color-coded with color intensity weighting to represent graduation of likelihood. Further, the color intensity weighted tracks can be shown along with a positional AOU surface plot of likelihood of solution tracks presented as color, intensity weighted pixels on a display monitor (not shown), and/or with the color and color intensity providing endpoint information. Software for providing colors and intensity weighted surface plots on computer monitor screens is commercially available (for example, Matlab from MathWorks, Inc., Natrick Mass.)

In FIG. 10A, the cost function for the ensemble of hypothesized trail tracks from FIG. 9 is displayed as an AOU surface plot 158 represented by contour lines which delineate the boundaries of containment areas representing likelihood of solution tracks in R1–R2 coordinates. Plot 158 shows in yards of these coordinates containment areas 152, 154, and 156 representing areas of containment of low, medium and high likelihoods, respectively, of trial tracks. Plot 158 of FIG. 10A clearly reflects bimodal grouping of solution tracks.

The same cost function from FIG. 9 and FIG. 10A is displayed in target velocity coordinates in FIG. 10B which constitutes a target course-speed AOU depicting uncertainty in the tracking solution course and speed. Surface plot 160 is represented by boundary lines for containment areas 166, 164, and 162 respectively representing low, medium, and high probabilities of containment of the tracking solution. It is worth noting that the same bimodal grouping of plausible tracks as shown in FIG. 10A is reflected in the velocity space, with a dominant set of track velocities heading North (y-axis direction) and another set of velocities heading East (x-axis direction).

The above description of providing a positional AOU cost surface plot may be conventionally provided in the form of a color, intensity weighted, pixel-based presentation on a computer system monitor using MathWorks, Inc. software, or any other suitable software.

Although described with respect to sonar inputs received from spherical sonars of submarine warfare sonars. It will be appreciated that the system and method in accordance with present invention can also be employed with other measurement types and additional constraints (such as towed array conical angles and sound propagation paths.)

Figure 11:
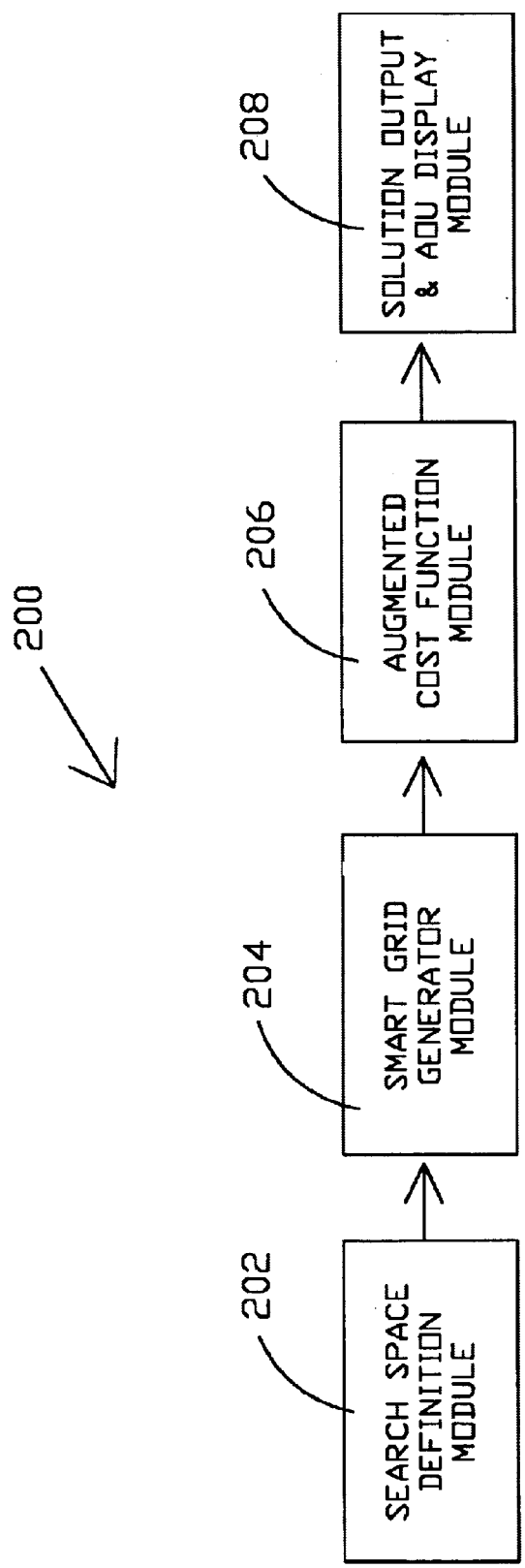
FIG. 11 is a block diagram of a system for an intelligent parameter evaluation plot (IPEP) in accord with the present invention.

The system block diagram for the intelligent parameter evaluation plot (IPEP) system 200 is shown in FIG. 11 provides a basic summary of the system and related method. Search Space Definition Module 202 defines and sets up the R1–R2 search space over which the Smart Grid is to be formed using the known parameter constraints. The Smart Grid Generator module 204 generates the grid of sample points in this constrained search space over which the cost is to be evaluated. The Augmented Cost Function Module 206 evaluates the different cost function components for the grid points and aggregates them to produce the overall cost surface. Finally, the Solution Output & AOU Display Module 208 finds the best tracking solution (defined as the minimum cost point), and computes the information necessary to display the Area of Uncertainty (AOU) associated with this solution.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for generating a range, bearing, course and speed of contact target motion analysis (TMA) solution based upon a bearing $\beta_1$ measured at an initial-time $T_1$ and a bearing $\beta_2$ measured at an end-time $T_2$ from an observation platform traveling along a single-leg trajectory, a range of said contact being unobservable from said observation platform during said single-leg trajectory except for a best estimation of an initial range $R_1$ at said initial-time $T_1$, comprising:

define a two dimensional grid plot whose orthogonal dimensional axis comprise a potential maximum and a minimum of said initial range $R_1$ from the observation platform at said initial-time $T_1$ and a potential maximum and a minimum of an end-time range $R_2$ from the observation platform at said end-time $T_2$, and further define within said grid plot a trial-track sampling space based upon at least one kinematics constraint upon the motion of the contact;

within said trial-track sampling space, define a pattern of location of a first plurality of R1–R2 coordinates to sample trial-tracks which at least to a significant degree, distribute the coordinates throughout the trial-track sampling space;

define a geographic plot which includes the single-leg trajectory of the observation platform and second and third reference lines along bearings $\beta_1$ and $\beta_2$, respectively, and mapping said first plurality of R1–R2 coordinates onto the geographic plot as a corresponding first plurality of trial-tracks of the contact; and compiling a sequence of bearing measurements $Z_n$ over a time sequence at least inclusive of times $T_1$ and $T_2$, and for each corresponding trial-track of said first plurality of trial-tracks calculating a goodness-of-fit cost function at least based upon the goodness-of-fit of the trial-tracks to said sequence of measurements $Z_n$.

2. The method of claim 1 wherein said at least one kinematics constraint includes constraining said first trial-track sampling space to include only possible loci for a contact having no more than a predetermined estimated maximum speed of the contact.

3. The method of claim 2 wherein the trial-track sampling space is further defined by further method elements comprising:
- calculate an ellipse in R1–R2 space encompassing possible loci for said contact if it were to have said predetermined estimated maximum speed and it were to follow a constraint course and speed trajectory between said second and third reference lines along bearings $\beta_1$, and $\beta_2$; and
- defining said trial-track sampling space as an ellipsoidally shaped sampling space.

4. The method of claim 3 wherein said pattern of locations of said first plurality of R1–R2 coordinate to sample trial tracks is further defined by method elements comprising:
- define a hypothetical range-ratio (RR) fourth reference line within said R1–R2 grid plot;
- define a plurality of spaced tie-down points along said fourth reference line;
- define a corresponding plurality of fifth reference lines passing through respective so said plurality of spaced tie-down points and orthogonal to the said fourth reference line; and
- distribute a part of said first plurality of R1–R2 coordinates to sample trial-tracks along each respective fifth reference line in a spaced relationship to one another and between the bounds of the two sides of said ellipsoidally shaped sampling space.

5. The method of claim 2 wherein an estimate of range-ratio, $R_2/R_1$ at time $T_1$ is available, and:
- said at least one kinematics constraint further includes constraining the sampling space to include only possible loci for the contact to have a course within a range of courses based upon an estimated direction of relative motion (DRM) which in turn is based upon the estimated range ratio $R_2/R_1$ and upon estimated measurement deviations therefrom.

6. The method of claim 5, wherein said sampling space is further refined as a multiple kinematics constraints formed sampling space by further methods elements comprising:
- calculate an ellipsoidally shaped first subspace of the R1–R2 grid plot encompassing possible loci for said contact if it were to have a predetermined estimated maximum speed and follow a constraint course and speed trajectory between the bearing $\beta_1$ and $\beta_2$ second and third reference lines;
- define a sixth referenced line in said R1–R2 grid plot having a slope equal to range-ratio $R_2/R_1$;
- define a range-ratio wedge shaped second subspace of the R1–R2 grid plot encompassing loci between a pair of seventh and eighth reference lines representing the bounds of spread of estimated measurement deviations from the estimated range ratio $R_2/R_1$; and
- define said multiple kinematics constraints formed sampling space as the loci within the intersection of said first and second subspaces.

7. The method of claim 6 wherein said pattern of locations of said first plurality of R1–R2 coordinates to sample trial tracks is further defined by method elements comprising:
- define a plurality of spaced tie-down points along said sixth reference line;
- define a corresponding plurality of ninth reference lines passing through respective of said plurality of spaced tie-down points and orthogonal to sixth reference line; and
- distribute a part of said first plurality of R1–R2 coordinates to sample trial-tracks at respective ones of each of said corresponding plurality of ninth reference lines in spaced relationship to one another and between the bound of said multiple kinematics constraints formed sampling space.

8. The method of claim 1 wherein said cost function is further based upon a prior estimate of the likelihood distribution of a tactical parameter which is used as a variable in the TMA solution.

9. A method of claim 8 wherein said tactical parameter is speed of the contact.

10. The method of claim 1 wherein the sequence of bearing measurement, $Z_n$, are obtained employing sonar, and:
- said cost function is further based upon an a priori estimate of a likelihood of distribution of an environmental parameter which influences sonar reception and which is used as a variable in the TMA solution.

11. The method of claim 7 wherein said environmental parameter is the maximum range of initial sonar detection of the contact along the bearing $\beta_1$ second reference line.

12. The method of claim 1 wherein the sequence of bearing measurement, $Z_n$, are obtained employing sonar; and
- said cost function is further based upon an a priori estimate of a likelihood of distribution of a tactical parameter used in as a variable in the TMA solution; and
- said cost function is yet further based upon an a priori estimate of an environmental parameter which influences sonar reception and which is used as a variable in the TMA solution.

13. The method of claim 1, and selecting the minimum cost trial-track as the TMA solution.

14. The method of claim 1, and:
- on the basis of the cost function of said second plurality of trial tracks in geographic plot space, calculating an area-of-uncertainty (AOU) of a type of the group of types of AOU's consisting of: an AOU cost surface in geographic plot space, an AOU cost surface in R1–R2 space, and an AOU cost surface in course-speed space.

15. A system for bearings only target motion analysis to determine a target position comprising a target range and a target bearing, and to determine a target velocity comprising a target course and a target speed based on a plurality of passive sonar contacts with a target of interest from an observation platform traveling along a single-leg trajectory such that said target range is not observable except for a best estimation of an initial target range having a potential maximum and minimum, an initial sonar contact being made at an initial time with an initial target bearing, and an end time sonar contact being made with an end time target bearing and an unobservable end time target rang having a potential maximum and minimum said system comprising:
- a search space module for determining a limited search space defined within a coordinate system comprised of said initial target range potential maximum and minimum as a first coordinate system axis and said endtime target range potential maximum and minimum as a second coordinate system axis, said limited search space being limited at least partially by a likelihood of maximum target speed such that all feasible tracks for said target with said likelihood of maximum target speed are contained within said limited search space;
- a grid sampling module for making data samples within said limited search space;
- a cost function module for determining at least a triple error cost function for said data samples based on at least three error components, said three error components comprising bearing data, initial target range data, and expected maximum target speed data; and a display module.

16. The system of claim 15, wherein said limited search space is formed by an intersection of a speed ellipse and a range-ratio wedge, wherein all feasible tracks for said target with said likelihood of maximum target speed are contained within speed ellipse, and wherein said range-ratio wedge is based on estimated range-ratio line of said final target range with respect to said initial target and estimated deviations from said range-ratio line.

17. The system of claim 15, wherein said search space module is operable for determining a range-ratio line based on an estimated ratio of said final target range with respect to said initial target range, and wherein said grid sampling module is operable to utilize points along said range ratio line to establish said grid with substantially uniform data samples.

18. The system of claim 15, wherein said display module is operable for producing a course speed display of said target in target velocity orthogonal coordinates.

19. The system of claim 18, wherein said display module is operable for producing a target position and positional uncertainty display in geographic orthogonal coordinates.

* * * * *